United States Patent [19]

Ohkura et al.

[11] Patent Number: 5,784,883
[45] Date of Patent: Jul. 28, 1998

[54] METHOD OF CONTROLLING SPEED CHANGE OF HYDRAULIC DRIVE DEVICE FOR VEHICLE AND SPEED CHANGE DEVICE

[75] Inventors: Yasunori Ohkura, Kawasaki; Hikosaburo Hiraki, Oyama; Noboru Kanayama, Ninomiya-machi; Ryutaro Makida, Kawasaki, all of Japan

[73] Assignee: Komatsu Ltd., Tokyo, Japan

[21] Appl. No.: 836,514

[22] PCT Filed: Nov. 8, 1995

[86] PCT No.: PCT/JP95/02279

§ 371 Date: May 8, 1997

§ 102(e) Date: May 8, 1997

[87] PCT Pub. No.: WO96/15394

PCT Pub. Date: May 23, 1996

[30] Foreign Application Priority Data

Nov. 9, 1994 [JP] Japan ................. 6-301495

[51] Int. Cl.$^6$ .................................................. F16D 31/00
[52] U.S. Cl. ................................ 60/327; 60/448; 60/449
[58] Field of Search ...................... 60/448, 449, 459, 60/490, 431, 327

[56] References Cited

U.S. PATENT DOCUMENTS 5,184,466  2/1993  Schniederjan et al. ................. 60/448

FOREIGN PATENT DOCUMENTS

| 51-31461   | 8/1976  | Japan . |
| 58-193961  | 11/1983 | Japan . |
| 60-88730   | 5/1985  | Japan . |
| 3-229003   | 10/1991 | Japan . |
| 6-183278   | 7/1994  | Japan . |

Primary Examiner—Thomas E. Denion
Assistant Examiner—Bijan N. Karimi
Attorney, Agent, or Firm—Sidley & Austin

[57] ABSTRACT

The present invention relates to a method of controlling a speed change of a hydraulic driving apparatus for a vehicle and to a speed changing device which provide excellent traveling efficiency and controllability. To this end, the method of controlling a speed change comprises discriminating between at least a powering travel and a braking travel from an accelerating amount (θ) and rotational speed of a hydraulic motor (50) for controlling. At the time of the powering travel, a directional control valve (21) can be fully opened in response to the rotational speed (ωout) of the hydraulic motor (50) and the accelerating amount (θ). In addition, the speed changing device comprises an accelerating amount detection sensor (61a), a motor rotational speed sensor (52) for detecting a vehicle speed (V), and a control device (60) for discriminating, from the accelerating amount (θ) and the vehicle speed (V), between the powering travel and the braking travel for providing a control.

22 Claims, 17 Drawing Sheets

METHOD OF CONTROLLING SPEED CHANGE OF HYDRAULIC DRIVE DEVICE FOR VEHICLE AND SPEED CHANGE DEVICE

TECHNICAL FIELD

The present invention relates to a method for controlling a speed change of a hydraulic driving apparatus for a vehicle and to a speed changing device, and more particularly, to a method for controlling a speed change of a hydraulic driving apparatus for use in construction vehicles, agricultural machinery, automobiles, etc., and to a speed changing device.

BACKGROUND ART

Hitherto, various types of power transmission devices for use in construction vehicles, agricultural machinery, automobiles, etc., such as the mechanical type, the hydraulic type, and the electric type, have been proposed and used. With regard to small vehicles for construction machines, those of the hydraulic type have been used relatively often. This is because the hydraulic type can change its running speed from zero to infinity, and its merit-of excellent operability has been highly regarded. On the other hand, the hydraulic type has disadvantages of lower efficiency and higher cost as compared to the mechanical type. However, operating machines for digging, earth moving, etc., are mounted in construction equipment, such as a wheel hydraulic excavator, and all of the power from an engine is converted by a hydraulic pump in order to actuate the operating machines, so that the use of hydraulic driving apparatuses may becomes less expensive conversely. When such hydraulic driving apparatuses are used, there are two types: closed circuit and open circuit. They have different characteristics, and they are used in accordance with the purpose.

For example, in construction machines used mainly for the purpose of traveling, when large amounts of flowing oil pressure is required, the open circuit type is used. Closed center load sensing circuits have been used in operating machines in terms of improvement in operability, and closed center valves are adopted therein. On the other hand, when traveling efficiency or controllability is emphasized, the closed circuit type is used, and a hydraulic travel pump and an operating machine hydraulic pump are used therein.

In addition, a circuit using a counterbalance valve, shown in FIG. 37, has been known; and it controls the return oil from the counterbalance valve to effect speed control (runaway prevention) when descending a slope. This construction comprises a variable displacement hydraulic pump 210, driven by a driving source 1 such as an engine; a capacity control device 211, for controlling the capacity of the hydraulic pump 210; a forward-reverse directional control valve 212; solenoid operated proportional valves 213 (forward) and 214 (reverse), for controlling the forward-reverse directional control valve 212; a counterbalance valve 215, connected to the forward-reverse directional control valve 212; a variable displacement hydraulic motor 216, for receiving the pressurized oil from the counterbalance valve 215; and a capacity control device 217, for controlling the capacity of the hydraulic motor 216.

However, the above-described conventional circuit encounters the following problems.

i) The use of the counterbalance valve in a traveling circuit reduces the efficiency because the valve is controlled by restriction. Moreover, since heat is generated while traveling, a large cooler and an engine of larger output are required, so that the size and cost of the vehicle increases.

ii) The use of the closed center valve, in the traveling circuit of a vehicle emphasizing workability, encounters a similar malfunction because the valve is controlled by restriction similar to the counterbalance valve. Particularly, in a high-speed, long-distance traveling vehicle, the resistance increases, reducing efficiency, and the heating value also increases so that a large cooler is required.

iii) The gradients of change of the engine rotational speed are taken on the same line during low speed operation and during high speed operation, so that follow-up properties of the engine with respect to the depressed amount of the brake pedal is bad or oversensitive during either of low speed operation and high speed operation.

iv) During forward F, or reverse R, if a shock at the time of starting is decreased, or slow speed forwarding is made possible, the starting properties deteriorate. If the starting properties are improved, the shock increases, or the slow speed forward cannot be effected.

v) The gradients of change of an inclination-rotation angle of the hydraulic motor are taken on the same line during low speed operation and during high speed operation, so that the ratio of change decreases to deteriorate the follow-up properties at the time of the high speed operation, and hunting occurs at the time of the low speed operation.

vi) The gradients of change of the inclination-rotation angle of the hydraulic motor are held constant with respect to a brake depression angle, so that the follow-up properties deteriorate when the brake depression angle is large. On the other hand, when the brake depression angle is small, the brake becomes too effective, providing a greater shock.

vii) If an operating lever is operated during a time of traveling, the operating machine is actuated, thereby incurring dangers.

viii) The discharge capacity of the hydraulic pump during forwarding and the discharge capacity of the hydraulic pump during reversing are equalized, so that the driving torque at the time of reversing, for escaping from uneven ground, etc., is insufficient.

ix) A plurality of hydraulic pumps is used, and a plurality of driving apparatuses is required therefor, so that the required space increases.

SUMMARY OF THE INVENTION

The present invention has been made to solve the drawbacks of the prior art, and its object is to provide a method of controlling a speed change of a hydraulic driving apparatus for a vehicle and a speed changing device which have excellent traveling efficiency and controllability.

In a first aspect of a method of controlling a speed change of a hydraulic driving apparatus for a vehicle according to the present invention, there is provided a method of controlling a speed change of a hydraulic driving apparatus for a vehicle which: operates a shifter to select forward operation or reverse operation of a vehicle, changes the rotational speed of an engine by an accelerating amount, and supplies pressurized oil from a hydraulic pump, driven by the engine, to a hydraulic motor through a directional control valve so as to control the rotational speed of the hydraulic motor for traveling the vehicle, the method comprising discriminating, from the accelerating amount and the rotational speed of the hydraulic motor, between a powering travel and a braking travel in order to provide a control therefor.

In addition, at the time of the powering travel, the directional control valve can be fully opened in response to the rotational speed of the hydraulic motor and the accelerating amount, thereby reducing the resistance of the directional control valve. Further, at the time of the braking travel, the directional control valve can be partially opened at a predetermined amount in response to the rotational speed of the hydraulic motor and the accelerating amount, and that predetermined amount of opening can be increased when the accelerating amount is large. Still further, at the time of the braking travel, return oil from the hydraulic motor can be allowed to have a high pressure, and can be fed to the supply side of the hydraulic motor when the inlet pressure to the hydraulic motor is lower than a permissible suction pressure of the hydraulic motor.

In a second aspect of the speed change control method, there is provided a method comprising at least one of the following: controlling absorbing torque of the hydraulic pump within a predetermined range in response to the rotational speed of the hydraulic motor and the rotational speed of the engine; controlling the rotational speed of the engine within a predetermined range in response to the accelerating amount and the rotational speed of the hydraulic motor; controlling a discharge capacity of the hydraulic motor within a predetermined range in response to the rotational speed of the hydraulic motor and the supply side pressure of the hydraulic motor; and controlling a discharge capacity of the hydraulic motor within a predetermined range in response to the accelerating amount and a braking amount at the time of operating a brake.

In a third aspect of the speed change control method, there is provided a method wherein, when calculating the absorbing torque of the hydraulic pump responsive to the rotational speed of the hydraulic motor and the rotational speed of the engine, the absorbing torque to be calculated takes different values when the selected position of the shifter is different ones of forward and reverse.

In a fourth aspect of the speed change control method, there is provided a method wherein, when the selected position of the shifter is forward or reverse, the directional control valve is partially opened at a predetermined amount in response to the accelerating amount and the rotational speed of the hydraulic motor in order to perform creep traveling.

In a fifth aspect of the speed change control method, there is provided a method comprising: selecting either a traveling mode or an operating mode; performing only traveling at the time of the traveling mode; and performing only operation, or both operation and traveling at the time of the operating mode.

In first aspect of a speed changing device for a hydraulic driving apparatus for a vehicle according to the present invention, there is provided a speed changing device for a hydraulic driving apparatus for a vehicle including: an engine, of which the rotational speed changes in response to an accelerating amount; a hydraulic pump, driven by the engine; a hydraulic motor, for receiving pressurized oil from the hydraulic pump to output a driving force and a rotational speed; and a directional control valve, provided between the hydraulic pump and the hydraulic motor, for switching between forward operation and reverse operation of the vehicle, the device comprising: an accelerating amount detection sensor for detecting the accelerating amount; a motor rotational speed detection sensor, for detecting the speed of the vehicle from the rotational speed of the hydraulic motor; and a control device, for discriminating between a powering travel and a braking travel by the detected accelerating amount and the detected vehicle speed, for controlling.

In a second aspect of the speed changing device, there is provided a speed changing device for a hydraulic driving apparatus for a vehicle including: an engine, of which the rotational speed changes in response to an accelerating amount; a brake pedal; and a hydraulic motor, for receiving pressurized oil from a hydraulic pump through a directional control valve, to run the vehicle; the device comprising: a motor rotational speed sensor, for detecting the speed of the vehicle from the rotational speed of the hydraulic motor; an accelerating amount detection sensor, for detecting the accelerating amount; and a control device, wherein the control device, at the time of the powering travel, fully opens the directional control valve in response to the rotational speed of the hydraulic motor and the accelerating amount in order to reduce the resistance of the directional control valve, and/or, at the time of the braking travel, partially opens the directional control valve only for a predetermined amount in response to the rotational speed of the hydraulic motor and the accelerating amount, and increases the opening amount of the directional control valve when the accelerating amount is large.

In a third aspect of the speed changing device, there is provided a speed changing device for a hydraulic driving apparatus for a vehicle including: an engine, of which the rotational speed changes in response to an accelerating amount; a brake pedal; and a hydraulic motor, for receiving pressurized oil from a hydraulic pump through a directional control valve to travel the vehicle; the device comprising: motor pressure sensors, for detecting the inlet pressure to the hydraulic motor and the outlet pressure from the hydraulic motor; a braking amount detection sensor, for detecting a braking amount of the brake pedal; a variable pressure two-stage back pressure valve, for controlling the return pressure of oil in a return circuit formed between the directional control valve and an oil tank; and a control device (60), wherein the control device, at the time of the braking, compares the detected inlet pressure with a permissible suction pressure of the hydraulic motor, and outputs a command to the two-stage back pressure valve to increase the return pressure when the detected inlet pressure is lower than the permissible suction pressure.

In a fourth aspect of the speed changing device, there is provided a speed changing device for a hydraulic driving apparatus for a vehicle including: an engine, of which its rotation speed changes in response to an accelerating amount; a shifter, for selecting between forward operation and reverse operation of the vehicle; a hydraulic motor, for receiving pressurized oil from a hydraulic pump through a directional control valve to travel the vehicle; and operating machine actuators, for receiving pressurized oil passing through said directional control valve, to drive an operating machine; the device comprising: a mode selection switch, for selecting an operating mode or a traveling mode; a mode detection sensor, for detecting the selected mode; and a control device, wherein the control device, when the traveling mode is selected, outputs an operating command to the directional control valve for supplying pressurized oil passing through the directional control valve to the hydraulic motor, and when the operating mode is selected, outputs either of an operating command for supplying pressurized oil passing through the directional control valve only to the hydraulic motor and an operating command for supplying pressurized oil passing through the directional control valve to the hydraulic motor and to the operating machine actuators.

In a fifth aspect of the speed changing device, there is provided a speed changing device for a hydraulic driving apparatus for a vehicle including: a driving source; an accelerator pedal, for changing the rotational speed of the driving source; a shifter, for selecting between forward operation and reverse operation of the vehicle; a hydraulic pump, driven by the driving source; a hydraulic motor, for receiving pressurized oil from the hydraulic pump, to output a driving force and a rotational speed; and a closed center directional control valve, provided between the hydraulic pump and the hydraulic motor, for selecting between forward operation and reverse operation of the vehicle in response to a selection of the shifter; the device comprising: an accelerating amount detection sensor for detecting an accelerating amount corresponding to the amount the accelerator pedal is depressed; a shifter selected position sensor for detecting a selection by the shifter; a motor rotational speed sensor, for detecting the rotational speed of the hydraulic motor; and a control device, wherein the control device judges, from the accelerating amount, the change of the selected position of the shifter, and the rotational speed of the hydraulic motor, whether a region is a powering region or a braking region.

According to such a construction of the present invention, a counterbalance valve is not used in a traveling circuit, and the directional control valve is controlled by restriction only when it is required, so that heating while traveling is reduced. This eliminates the need for a large cooler and also the need for an engine of a larger output, so that the vehicle can be reduced in size and the fuel economy is improved. The cost of the vehicle is also reduced. In addition, the engine rotational speed and the discharge capacity of the hydraulic motor are changed separately during low speed operation and during high speed operation, and they are changed with a predetermined range between low speed operation and high speed operation. Separate controls can be effected during low speed operations and during high speed operations, so that the follow-up properties of the engine are improved. As the hydraulic motor is constructed similarly, the follow-up properties with respect to the change of the required torque amount are excellent, and an occurrence of hunting can be prevented even if the vehicle speed is low. Further, at the time of braking, if the brake depression angle is large, the discharge capacity of the hydraulic motor is increased to improve the follow-up properties, so that the brake becomes easily effective. On the other hand, if the brake depression angle is small, braking can be slowed down to effect slight movement braking. In addition, the discharge capacity of the hydraulic motor, while reversing, is increased so as to be larger than that while forwarding, in order to provide a large output torque, so that an escape from uneven ground, etc., is facilitated.

Further, by selecting the operating mode, an improvement in operability, which is a merit of the closed center load sensing circuit, can be obtained. On the other hand, when the traveling mode is selected, the resistance and the heating value can be reduced by opening the closed center valve, and an improvement in traveling efficiency can be achieved. Particularly, in a vehicle having an operating machine, by also using the hydraulic pump of the operating machine in the traveling circuit, only one hydraulic pump is sufficient, so that the required space and cost of the vehicle can be reduced. In addition, as a measure to the nonuse of the counterbalance valve, discharge side return oil from the hydraulic motor can be sent to a supply side pipe from the hydraulic pump to the hydraulic motor through suction valves, thereby preventing occurrence of cavitation.

Further, a traveling mode and an operating mode are provided, and at the time of the traveling mode, operation can be safely performed without any operation of the operating machine even if the operating lever is operated; and the operating machine takes priority at the time of the operating mode, so that a vehicle with good workability can be provided.

BRIEF DESCRIPTION OF DRAWINGS

FIG. 7 is a diagram showing the relationship among the engine rotational speed, the engine torque, and the discharge amount of the hydraulic pump;

FIG. 8 is a diagram showing the relationship among the accelerating amount, the engine rotational speed, and the vehicle speed;

FIG. 9 is a diagram showing the relationship among the vehicle speed, the opening degree command value of a travel valve, and the accelerating amount;

FIG. 10 is a diagram showing the relationship between the frequency of a low-pass filter, through which a flow rate command value is passed, and the gain;

FIG. 11 is a diagram showing the relationship between the inlet pressure to a hydraulic motor and the inclined shaft command value of the hydraulic motor during traveling;

FIG. 12 is a diagram showing the relationship between the rotational speed of the hydraulic motor and the inclined shaft command value of the hydraulic motor during braking;

FIG. 13 is a diagram showing the relationship between the frequency of a low-pass filter, through which the inclined shaft command value is passed, and the gain;

FIG. 14 is a diagram showing the relationship between the forward flow rate command value and the current of the forward solenoid operated directional control valve;

FIG. 15 is a diagram showing the relationship between the reverse flow rate command value and the current of the reverse solenoid operated directional control valve;

FIG. 16 is a diagram showing the relationship between the inclined shaft command value of the hydraulic motor and the current of the solenoid operated directional control valve for the hydraulic motor;

FIG. 17 is a diagram showing the relationship between the absorbing torque command value to the TVC valve and the current;

FIG. 18 is a diagram showing the relationship between the engine rotational speed command value and the current to a solenoid;

FIG. 22 is a diagram showing the relationship among the engine rotational speed, the engine torque, and the discharge amount of the hydraulic pump;

FIG. 23 is a diagram showing the engine rotational speed with respect to the engine rotational speed setting;

FIG. 24 is a diagram showing the relationship among the accelerating amount, the accelerating correction amount, and the engine rotational speed;

FIG. 25 is a diagram showing the relationship among the vehicle speed, the opening degree command value of a travel valve, and the accelerating correction amount;

FIG. 26 is a diagram showing the relationship between the frequency of a low-pass filter, through which the flow rate command value is passed and the gain;

FIG. 27 is a diagram showing the relationship between the inlet pressure to a hydraulic motor and the inclined shaft command value of the motor;

FIG. 28 is a diagram showing the relationship between the accelerating amount and the inclined shaft command value of the motor during braking;

FIG. 29 is a diagram showing the relationship between the frequency of a low-pass filter, through which the inclined shaft command value on braking is passed, and the gain;

FIG. 30 is a diagram showing the relationship between the forward flow rate command value and the current of the forward solenoid operated directional control valve;

FIG. 31 is a diagram showing the relationship between the reverse flow rate command value and the current of the reverse solenoid operated directional control valve;

FIG. 32 is a diagram showing the relationship between the inclined shaft command value of the hydraulic motor duing braking and the current of the hydraulic motor solenoid operated directional control valve;

FIG. 33 is a diagram showing the relationship between the absorbing torque command value, to the TVC valve, and the current;

FIG. 34 is a diagram showing the relationship between the fuel injection amount command value and the solenoid current;

BEST MODE FOR CARRYING OUT THE INVENTION

The preferred embodiments of a method of controlling a speed change of a hydraulic driving apparatus for a vehicle and of a speed changing device, according to the present invention will be described in detail with reference to the attached drawings.

Figure 1:
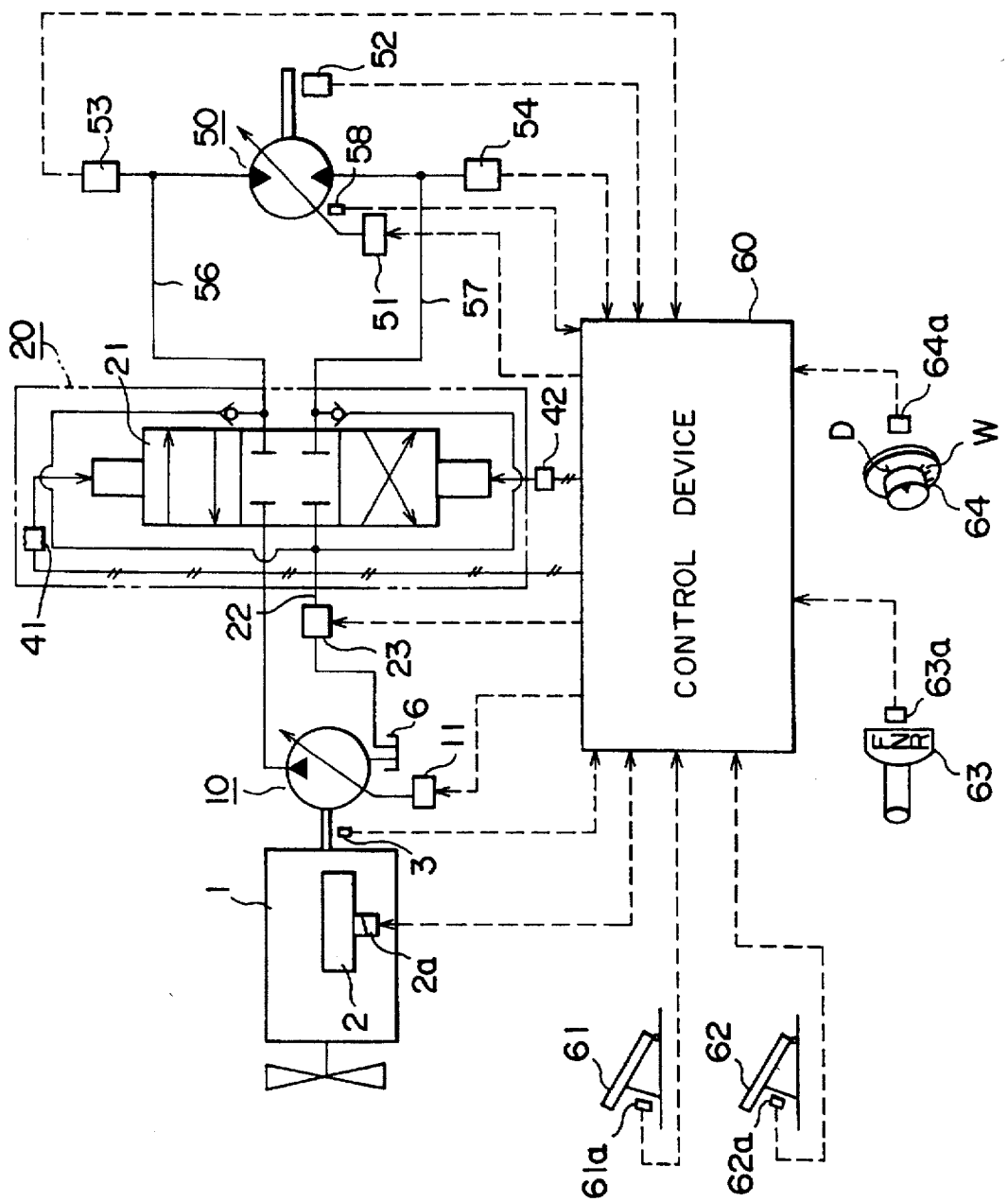
FIG. 1 illustrates a concept of a speed changing device for a hydraulic driving apparatus for a vehicle according to a first embodiment of the present invention.

Referring to FIG. 1, a variable displacement hydraulic pump 10 (hereinafter, referred to as a hydraulic pump 10), driven by an engine 1, sucks oil from an oil tank 6, converts an output of the engine 1 into pressurized oil, and feeds the pressurized oil to a variable displacement hydraulic motor 50 (hereinafter, referred to as a hydraulic motor 50) via a switching device 20. The hydraulic motor 50 converts the pressurized oil from the hydraulic pump 10 into rotary torque so as to drive a construction vehicle, etc. Such a hydraulic driving apparatus has already been known. A fuel injection pump 2 for supplying fuel to the engine 1 is attached to the engine 1; and a solenoid 2a, for example, is attached to the fuel injection pump 2. The solenoid 2a receives a command from a control device 60, such as a controller, etc., to control the fuel supplied to the engine 1, and to control the rotational speed and the output of the engine 1.

A servo device 11, which can allow absorbing torque to be variable, is attached to the hydraulic pump 10; and a servo device 51, which controls a swash plate, etc., for allowing the displacement to be variable, is attached to the hydraulic motor 50. Pressurized oil is supplied to the servo devices 11 and 51 via a solenoid operated directional control valve, etc., which are switched upon receipt of a command from the control device 60. The servo devices 11 and 51 switch and control the pressurized oil, and control the absorbing torque of the hydraulic pump 10 and the discharge capacity of the hydraulic motor 50.

A closed center load sensing travel valve 21 (hereinafter, referred to as the travel valve 21) of the switching device 20 has three positions, and pilot pressures from the solenoid operated directional control valves (solenoid operated proportional control valves) 41 and 42, which are provided at both ends, act thereon to switch the valve 21 to a forward operation position or to a reverse operation position. The solenoid operated directional control valves 41 and 42 are switched upon receipt of a command from the control device 60. A return circuit 22, formed between the travel valve 21 and the oil tank 6, is provided with a two-stage back pressure valve 23, which is switched in two stages by a command from the control device 60, and controls the return pressure of the oil to be returned to the tank 6.

The control device 60 is provided with an engine rotational speed sensor 3, for detecting the rotational speed of the engine 1; a motor rotational speed sensor 52, for detecting a rotational speed of the hydraulic motor 50 in order to detect a vehicle speed; and motor pressure sensors 53 and 54 for detecting a motor inlet pressure and a motor outlet pressure of the oil which flows in and flows out of the hydraulic motor 50 via a pipe 56 or a pipe 57. An angle sensor 58, for measuring the inclination-rotation angle a of the swash plate, etc., is attached to the hydraulic motor 50 in order to detect the braking capacity of a retarder for braking the vehicle. Here, in order to make it understandable, for reasons of convenience, the motor pressure sensor 53, secured to the pipe 56 through which pressure acts in the direction of forward rotation of the hydraulic motor 50, is referred to as the forward pressure sensor 53, and the motor pressure sensor 54, secured to the opposite side pipe 57, is referred to as the reverse pressure sensor 54. Incidentally, although the motor rotational speed sensor 52 detects the rotational speed and direction, two sensors can be provided to separately detect the rotational speed and the direction.

In addition, the control device 60 is provided with an accelerator pedal 61, for controlling the vehicle speed; a brake pedal 62, for controlling a braking of the vehicle, a shifter 63, for selecting a vehicle traveling direction (referred to as forward F, reverse R, and neutral N); and a mode selection switch 64. The mode selection switch 64 is the switch which actuates an operationg machine switching device 45 for driving an operation machine (not shown) and selects an operating mode W for the purpose of mainly operating (including an operation while traveling), or a traveling mode D for effecting only vehicle traveling. The control device 60 is provided with an engine rotational speed setting dial 66, for setting the rotational speed of the engine 1 during operation.

An accelerating amount detection sensor 61a, for detecting an accelerating amount, is attached to the accelerator pedal 61; a braking amount detection sensor 62a, for detecting a braking amount, is attached to the brake pedal 62; a shifter selected position sensor 63a, for detecting a vehicle traveling direction, is attached to the shifter 63; and a mode detection sensor 64a, for detecting the selection of the operating mode W or the traveling mode D, is attached to the mode selection switch 64.

Each of the above-described sensors is connected to the control device 60, and predetermined signals are inputted to the control device 60 therefrom.

Figure 2:
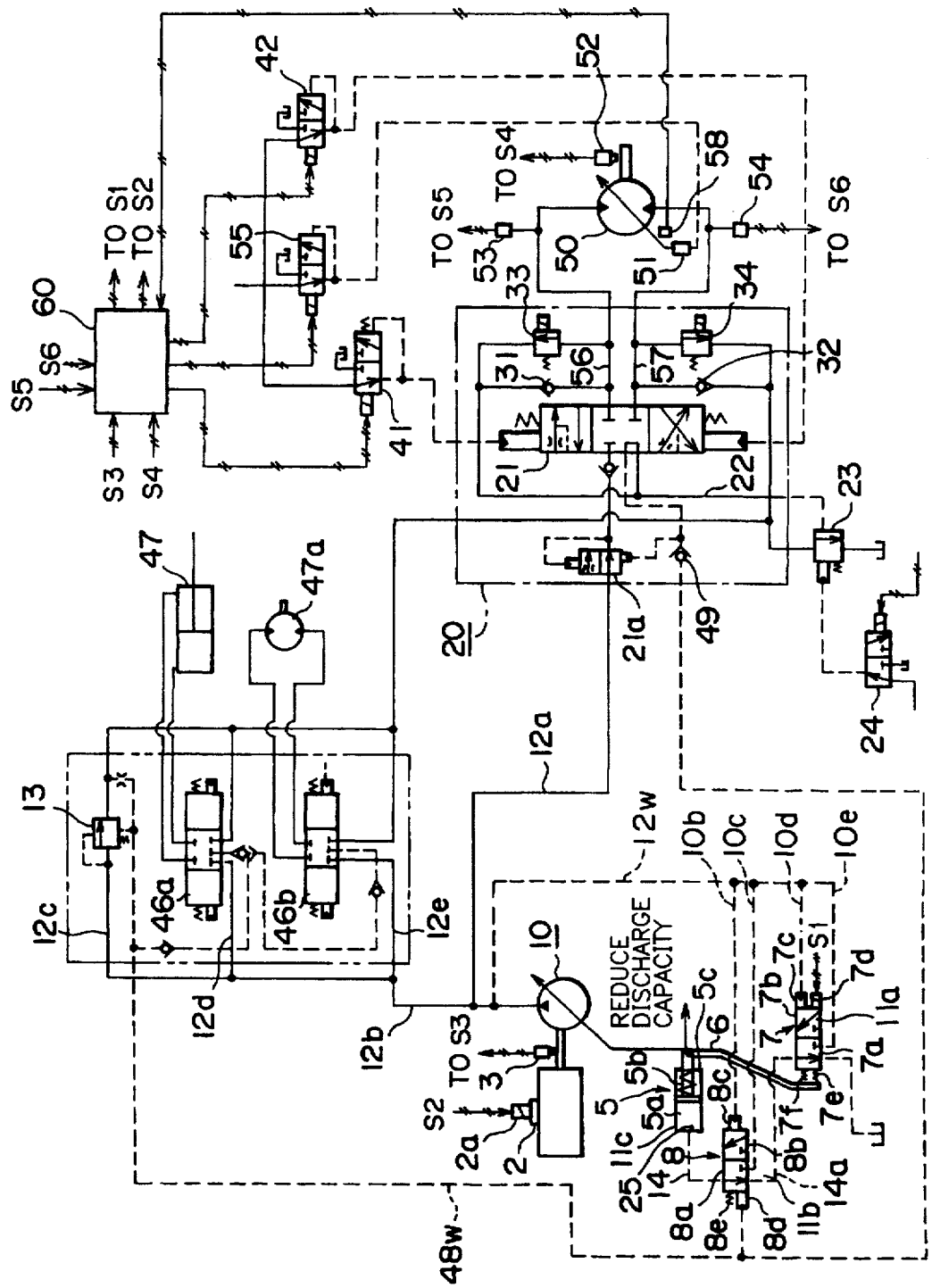
FIG. 2 is a detail circuit diagram for the device of FIG. 1.

Referring to FIG. 2, a pipe 12 is secured to a hydraulic pump 10, the pipe 12 is branched, and one branch pipe 12a is connected to a vehicle driving force switching device 20. The other branch pipe 12b is further branched into pipes 12c, 12d, 12e, . . . To the pipe 12c, an unload valve 13 is connected, and to the pipes 12d, 12e, . . . , a plurality of operating machine closed center load sensing valves 46a, 46b . . . (hereinafter, referred to as operating machine CLSS valves 46a, 46b . . .) are connected. The operating machine CLSS valve 46a supplies and discharges pressurized oil to and from the operating machine actuator 47, while the CLSS valve 46b supplies and discharges pressurized oil to and from the operating machine actuator 47a.

The servo device 11 of the hydraulic pump 10 is composed of a torque value control valve 11a (hereinafter, referred to as a TVC valve 11a), a load sensing valve 11b (hereinafter, referred to as an LS valve 11b), and a servo 11c. The control device 60 and a pilot tube 12w, extending from the pipe 12, are connected to the TVC valve 11a. The TVC valve 11a has a power mode function such that it receives a command from the control device 60, widely controls discharge pressure of the hydraulic pump 10 to send pressurized oil to the LS valve 11b, and widely and freely controls the discharge amount of the hydraulic pump 10.

For example, when a command current from the control device 60 is in a low range, the pump discharge amount is increased to the maximum, and when the command current is in a high range, the pump discharge amount is reduced, thereby effecting a constant horsepower control, etc., for holding pump discharge capacity×discharge pressure constant. A pilot tube 12w, extending from the pipe 12, and a tube 48w of an LS circuit are connected to opposite ends of the LS valve 11b. The LS valve 11b receives the the discharge pressure PP of the hydraulic pump 10, and the highest pressure PS among the pressures from the circuit (LS circuit) of the travel valve 21 and the operating machine CLSS valves 46a, 46b . . . through check valves 49 and 49a. The LS valve 11b controls the pressure from the TVC valve 11a to send to the servo 11c so that an LS differential pressure (PLS=PP−PS), which is the differential pressure (PP−PS) therebetween, is held constant, thereby controlling an angle of the swash plate (the discharge amount of the pump) of the hydraulic pump 10.

The vehicle driving force switching device 20 comprises the travel valve 21, a pressure compensation valve 21a, suction valves 31 and 32, and safety valves 33 and 34. The suction valves 31 and 32 and the safety valves 33 and 34 are attached to the travel valve 21. Each first side of the suction valves 31 and 32 and the safety valves 33 and 34 is connected between the travel valve 21 and the hydraulic motor 50, and each second side thereof is connected between the travel valve 21 and the two-stage back pressure valve 23 by means of the return circuit 22 from the travel valve 21. Incidentally, the suction valves 31 and 32 and the safety valves 33 and 34 can be mounted to pipes without being attached to the travel valve 21.

In addition, at both ends of the travel valve 21, pilot pressures for switching to forward or reverse act on the end surfaces thereof so as to switch the travel valve 21 in response to an operation of the shifter 63 (FIG. 1). The pilot pressures are generated in such a manner that discharge pressure of a non-illustrated pilot pump receives a command from the control device 60, and the forward solenoid operated directional control valve 41 or the reverse solenoid operated directional control valve 42 is switched, whereby a predetermined pilot pressure responsive to the command is generated.

A motor solenoid operated directional control valve 55 is switched upon receipt of a command from the control device 60, and the pressure of the pilot pump acts on the servo device 51 so as to control the displacement of the hydraulic motor 50. The hydraulic motor 50 receives the discharge amount from the hydraulic pump 10 in response to an accelerating amount so as to output a predetermined rotational speed, i.e., a predetermined vehicle speed.

The solenoid operated directional control valve 24 is switched upon receipt of a command from the control device 60, and the pressure of the pilot pump acts on the two-stage back pressure valve 23 so as to control the pressure of oil returning to the tank 6 in two steps of a high pressure and a low pressure. When high pressure, the discharge side return oil from the hydraulic motor 50 is fed to either of the supply side pipes 56 and 57 through the suction valve 31 or 32. When low pressure, the return oil is mainly returned to the oil tank 6. At this time, a part of the return oil is fed as needed to either of the pipes 56 and 57 of the supply side from the hydraulic pump 10 to the hydraulic motor 50.

Regarding an operation due to the above-described construction, a mode selection for operating a hydraulic driving apparatus will be first described.

In a non-illustrated construction vehicle having an operating machine, an operation of a hydraulic driving apparatus, comprising the hydraulic pump 10, the travel valve 21 and the hydraulic motor 50, is selected by a mode selection switch 64. Referring to the flow of FIG. 3, when the mode selection switch 64 is selected to a hydraulic driving control of the traveling mode D in step 301, the procedure advances to step 302. In step 302, the traveling mode D is detected by the mode detection sensor 64a, and a signal of the traveling mode D is sent to the control device 60. In the control device 60, a map of the traveling mode D and judgment are accessed. That is, a command signal of the traveling mode D for effecting only traveling is outputted from the control device 60. For example, when a non-illustrated operating machine lever is operated to operate the operating machine 47, the operating machine CLSS valve 46a is controlled so as not to be actuated.

In step 301, when the mode selection switch 64a is selected to a hydraulic driving control on operation (operating mode W), the procedure advances to step 303. In step 303, similar to step 302, a map of the operating mode W and judgment are accessed, and a command signal of the operating mode W, mainly for the purpose of operating, is outputted. For example, in performing an operation while traveling, if the travel valve 21 and the operating machine CLSS valves 46a, 46b . . . are operated simultaneously, a command signal, mainly for the purpose of supplying pressurized oil to the operating machine CLSS valves 46a, 46b . . . , is outputted from the control device 60 when a small amount is discharged from the hydraulic pump, while a command signal for supplying pressurized oil to the travel valve 21 and the operating machine CLSS valves 46a, 46b .... is outputted from the control device 60 when a large amount is discharged.

Figure 4:
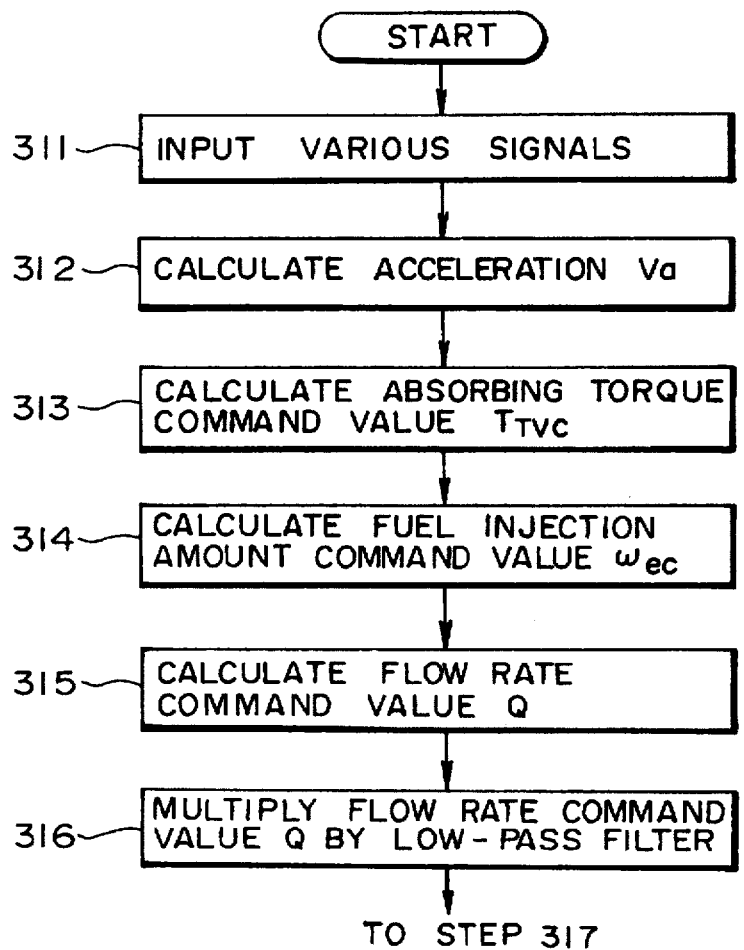
FIGS. 4 to 6 are flowcharts of a series of controls when selecting a traveling mode according to the first embodiment.

Next, a hydraulic driving control when the traveling mode D is selected will be described with reference to FIG. 4, FIG. 5, and FIG. 6. Incidentally, a control of the discharge capacity of the hydraulic motor 50 during traveling and during retarding (braking), and the switching operation of the two-stage back pressure valve 23 will be described.

In step 311, various signals are inputted to the control device 60. That is, the control device 60 reads in ever-changing signals from the various sensors. The signals include a change of the shifter position (a change of forward F, reverse R, neutral N), from the shifter selected position sensor 63a; an engine rotational speed ωe, from the engine rotational speed sensor 3; an accelerating amount θ, from the accelerating amount detection sensor 61a; a motor rotational speed ωout (i.e., the speed V of the vehicle) from the motor rotational speed sensor 52; inlet and outlet pressures Ppc of the hydraulic motor 50, from the motor pressure sensors 53 and 54; and a braking capacity Rc of the retarder, from the angle sensor 58. Among the inlet and outlet pressures Ppc detected by the motor pressure sensors 53 and 54, the inlet pressure to the hydraulic motor 50 is referred to as Pb. Incidentally, an output shaft rotational speed can be substituted for the motor rotational speed ωout.

In step 312, an acceleration Va of the vehicle is calculated from the change of the vehicle speed V, that is, determined by excluding the former ωout1 from the current ωout2 (Va=Δωout=ωout2−ωout1).

In step 313, an absorbing torque command value $T_{TVC}$ of the hydraulic pump 10 is calculated. This is effected in such a manner that the absorbing torque is obtained according to the map of FIG. 7 from the engine rotational speed ωe and the motor rotational speed ωout, and the control device 60 outputs the absorbing torque command value $T_{TVC}$ to the TVC valve 11a, which controls the discharge amount of the hydraulic pump 10.

Figure 7:
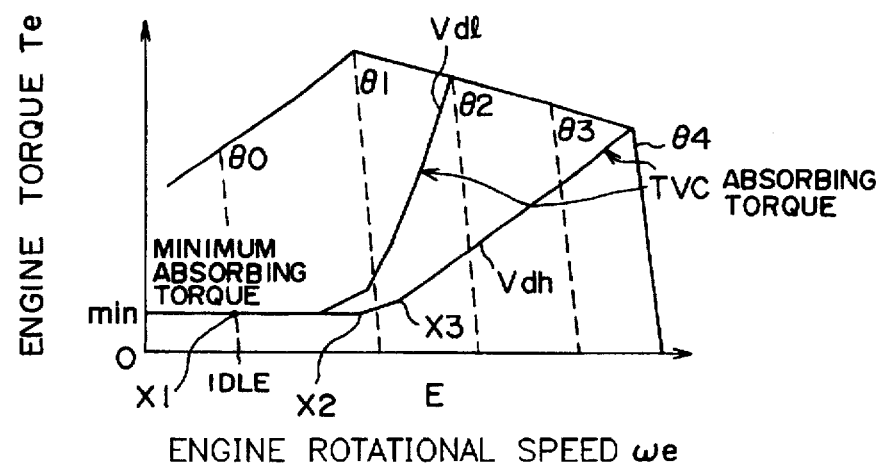
FIGS. 7 to 18 are diagrams in the traveling mode according to the first embodiment.

Now, an absorbing torque control of the hydraulic pump will be described. FIG. 7 shows the horizontal axis as the engine rotational speed ωe, the vertical axis as the engine torque Te, and the absorbing torque TVC of the hydraulic pump 10 due to the TVC valve 11a. In addition, the accelerating amount θ ($θ_0=0$, $θ_1=¼$, $θ_2=¾$, $θ_3=¾$, $θ_4=¼$ Full) is represented by the slanting dashed lines. A solid line Vdh represents a change of the TVC absorbing torque when the vehicle speed is in a high range, and a solid line Vdl represents a change of the same when the vehicle speed is in a low range.

Referring to FIG. 2, upon receipt of the vehicle speed V from the vehicle speed sensor 52, and the engine rotational speed we from the engine rotational speed sensor 3, the control device 60 outputs a command to the TVC valve 11a so that the pump discharge amount×discharge pressure changes as predetermined in response to the engine rotational speed ωe.

For example, when the position of the shifter 63 is selected for neutral N at the position where the accelerating amount θ of $θ_0=0$, and at the position where the engine rotational speed ωe is on the point X1, the vehicle is suspending, or moving at a slow speed by dragging torque. At this time, the hydraulic pump 10 discharges a predetermined minimum capacity, and discharged oil returns to the oil tank 6 from the unload valve 13.

When the shifter 63 is selected for forward F, the control device 60 receives the signal from the shifter selected position sensor 63a and sends to the forward solenoid operated directional control valve 41 a signal responsive to the accelerating amount. The solenoid operated directional control valve 41, which is switched by the signal in response to the accelerating amount, controls the pilot pressure to send to the travel valve 21, and partially opens the travel valve 21 at a predetermined opening degree. When the accelerator pedal 61 is further depressed, the travel valve 21 maintains a predetermined constant opening degree until a position where the accelerating amount θ is near the front of $θ_1=¼$ (the engine rotational speed ωe is on the position of the point X2). Therefore, until the point X2, the vehicle is moving at a slow speed by dragging torque in the same manner as described above, so that garaging, etc., are facilitated.

Further, when the accelerator pedal 61 is depressed, and the accelerating amount θ is on the position immediately after $θ_1=¼$ (the engine rotational speed ωe is on the position of point X3), the travel valve 21 maintains a full opening. At the same time, the control device 60 sends a command to the TVC valve 11a to actuate the servo device 11, and increases the absorbing torque (for example, displacement or pressure). This reduces a shock at the time of starting, because the vehicle is started by the dragging torque at the beginning, and the speed increases after a while, and a smooth starting can be effected without any resistance because the travel valve 21 is fully opened. In addition, a reduction in the heating value and an improvement in the traveling efficiency can be obtained. When the engine rotational speed we passes the point X3, the displacement of the hydraulic pump 10 increases, and the absorbing torque of the hydraulic pump 10 increases rapidly, thereby responding to the change of the vehicle speed with good follow-up properties. In addition, a large engine torque Te is taken when the vehicle speed is in the low range for the purpose of generating a feeling such as that of a torque converter.

In step 314, a fuel injection amount command value ωec to the engine 1 is calculated. That is, the engine rotational speed ωe is obtained from the accelerating amount θ and the motor rotational speed ωout shown in the map of FIG. 8, and a command signal is outputted from the control device 60 to the solenoid 2a of the fuel injection pump 2, which controls the engine rotational speed ωe.

Figure 8:
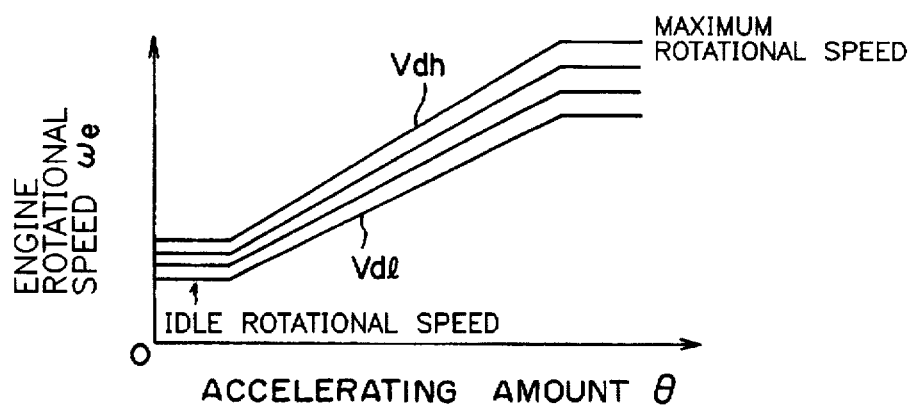

Now, the control of the engine rotational speed ωe will be described. Referring to FIG. 8, the horizontal axis represents an accelerating amount θ, the vertical axis represents the engine rotational speed ωe, and the vehicle speed V is represented by the solid lines. The solid line Vdh represents the change of the engine rotational speed ωe when the vehicle speed is in a high range, and the solid line Vdl represents the same when the vehicle speed is low. When the vehicle speed is in the high range, the gradient of the change of the engine rotational speed ωe is increased, and the gradient is decreased when the vehicle speed is in the low range.

Upon receipt of the vehicle speed V, from the vehicle speed sensor 52, and the accelerating amount ω, from the accelerating amount detection sensor 61a, the control device 60 outputs a command value ωec to the solenoid 2a so that the rotational speed changes as predetermined in response to the accelerating amount θ following FIG. 8. By the command value ωec, a predetermined injection amount of fuel is sent to the engine 1, and the engine rotational speed ωe becomes a predetermined rotational speed. For example, when the solid line Vdh of traveling in the high speed range, the maximum rotational speed is increased to absorb the engine output as much as possible. Conversely, when in the low speed range, motor output torque is required, so the maximum rotational speed of the engine 1 is set low. In addition, a range of an idling rotational speed is prepared, and when changing to the idling range from the high speed traveling range, the idling is set relatively high so as to increase cooling capability.

In step 315, a flow rate command value Q of the travel valve 21 is calculated. This is effected in such a manner that a flow rate Q of the travel valve 21 (an opening degree amount command value L of the travel valve 21) is obtained from the map shown in FIG. 9 according to the accelerating amount e and the motor rotational speed ωout (the vehicle speed V), and the flow rate command value Q signal is outputted from the control device 60 to the solenoid operated directional control valves 41 and 42, which control the flow rate Q of the travel valve 21.

Figure 9:
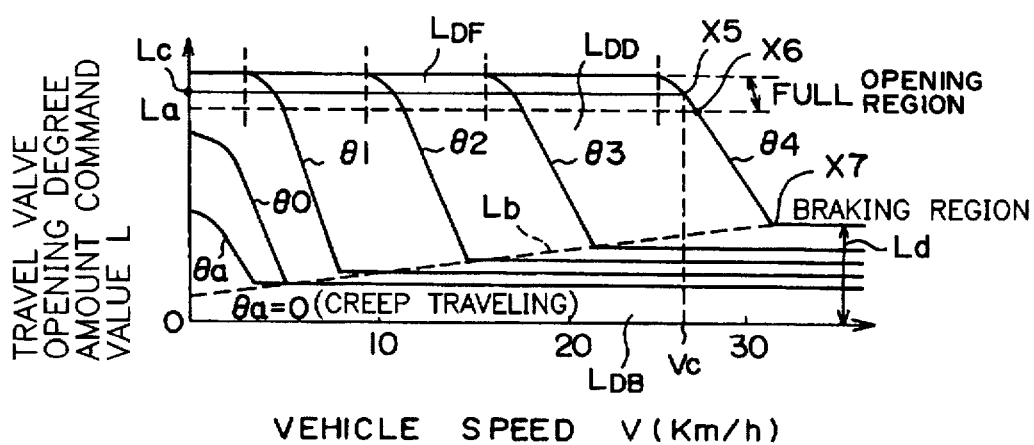

Now, the control of the opening degree of the travel valve 21 will be described. Referring to FIG. 9, the horizontal axis represents the vehicle speed V, the vertical axis represents the opening degree amount command value L of the travel valve 21, and the accelerating amount $\theta(\theta_0=0, \theta_2=\frac{1}{3}$ Full, $\theta_3=\frac{2}{3}$ Full, $\theta_4=$Full) is represented by solid lines. The area beneath the slanting dashed line Lb represents a braking region LDB, and the area above the line Lb represents a traveling region LDD. In addition, in the traveling region LDD, the opening of a spool shows a full opening region LDF when the opening degree command value of the travel valve 21 is not less than a predetermined value La. Further, a portion of the slanting solid line of the accelerating amount θ represents a speed balance region (a CLSS control region), and a control by the travel valve 21 is effected in the speed balance region. In the full opening region LDF, the opening degree of the travel valve 21 is provided with predetermined openings, each becoming full in accordance with the accelerating amount θ, so that even a small accelerating amount θ is included in the full opening region LDF. This reduces a flow rate resistance, eliminates pressure collapse, and reduces heating.

Incidentally, although the opening degree amount value is shown in FIG. 9, the opening degree of the travel valve 21 is proportional to the flow rate (Q=K·L) in the CLSS control. Thus, the flow rate command value Q for flowing from the hydraulic pump 10 to the hydraulic motor 50 will be obtained based on the opening degree of the travel valve.

In the braking region LDB, the opening degree amount command value L of the travel valve 21 is changed in response to the accelerating amount θ. In this range, the opening degree amount command value L of the travel valve 21 is not closed, and the larger the accelerating amount θ, the more the opening degree amount command value L is increased. Thus, even if brakes are applied to the vehicle, the vehicle does not stop suddenly, but suitably reduces speed. Further, at the left side of $\theta_1$ shown in the drawing, similar to the above-description, a creep traveling is performed in which the vehicle moves at a slow speed by a dragging torque. In addition, in the traveling mode D, the vehicle rarely runs by the control in the speed balance control between the full opening region LDF and the braking region LDB.

Referring to FIG. 9, upon receipt of the signals of the vehicle speed V and the accelerating amount θ, the control device 60 reduces the traveling in the speed balance control, minimizes any pressure collapse due to the travel valve 21, and obtains the command valve Q to be outputted to the solenoid operated directional control valves 41 and 42 in accordance with FIG. 9 so as to excellently maintain braking properties.

For example, when the vehicle is traveling with the accelerating amount θ on the position of $\theta_4$=Full, and at high-speed (point X5) vehicle speed Vc, the accelerating amount θ and the vehicle speed Vc are detected by each of the sensors, and sent to the control device 60. The control device 60 receives the signals and outputs an opening degree command value Lc in the full opening region LDF, through the solenoid operated directional control valves 41 and 42 for minimizing pressure collapse due to the travel valve 21. Further, when the accelerating amount θ remains as it is, and the vehicle speed Vc increases due to downhill travel, etc., the vehicle speed Vc and the opening degree command value Lc change along the line of the accelerating amount $\theta_4$=Full.

At this time, from point X6 to point X7 on the line of the accelerating amount $\theta_4$=Full, the speed balance control (CLSS control region), i.e., the opening amount of the travel valve 21 gradually reduces, and a speed control for giving a braking force is effected. When the speed increases to at least the point X7, the opening amount of the travel valve 21 becomes a predetermined constant value Ld, and the travel valve 21 gives a predetermined resistance, corresponding to the speed, and generates a braking force. Over the high speed point X6, the two-stage back pressure valve 23 actuates to control the return pressure of the oil returning to the tank 6 at a high pressure, and oil is supplied to the hydraulic motor 50 from the hydraulic pump 10 and either the suction valve 31 or the suction valve 32.

In addition, when the shifter 63, for selecting the traveling direction of the vehicle, is in forward F or reverse R, at the left side of the accelerating amount θ of θa shown in the drawing, the travel valve 21 is opened only a predetermined small amount, thereby providing creep traveling. This creep traveling enables shock reduction and slow speed forwarding, as described above.

Figure 10:
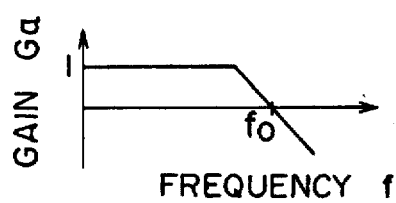

In step 316, the output of a low-pass filter, shown in FIG. 10, is multiplied by the flow rate command value Q of the travel valve 21. That is, a command signal to the solenoid operated directional control valves 41 and 42 for switching the travel valve 21, removes noises, having a high-frequency f0 or greater, with the low-pass filter (this is expressed by Qa=Ga×Q in terms of a transfer function). This prevents very small pressure vibrations of the travel valve 21, so that speed changes of the vehicle due to vibrations of the travel valve 21 is eliminated.

Figure 5:
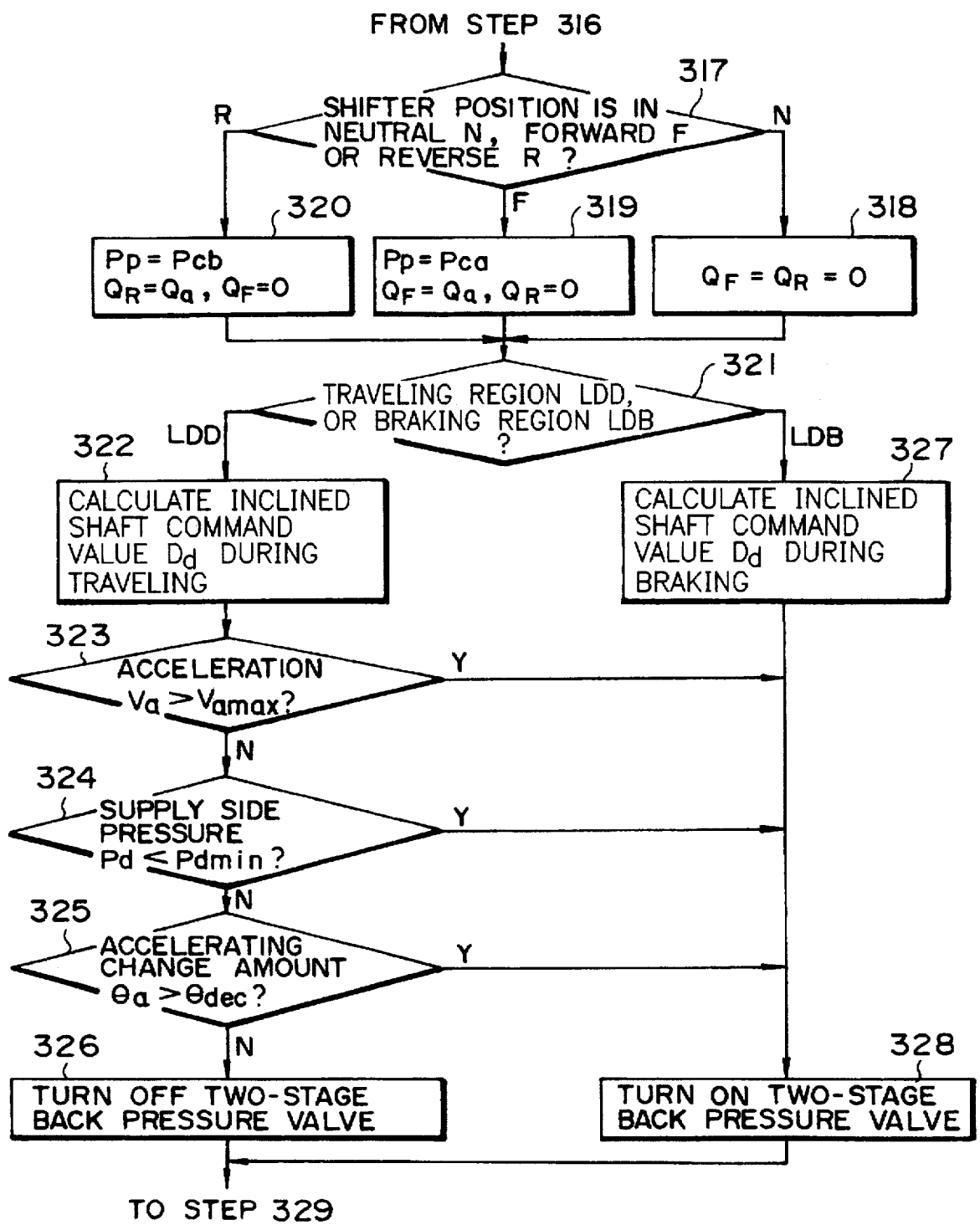
Figure 6:
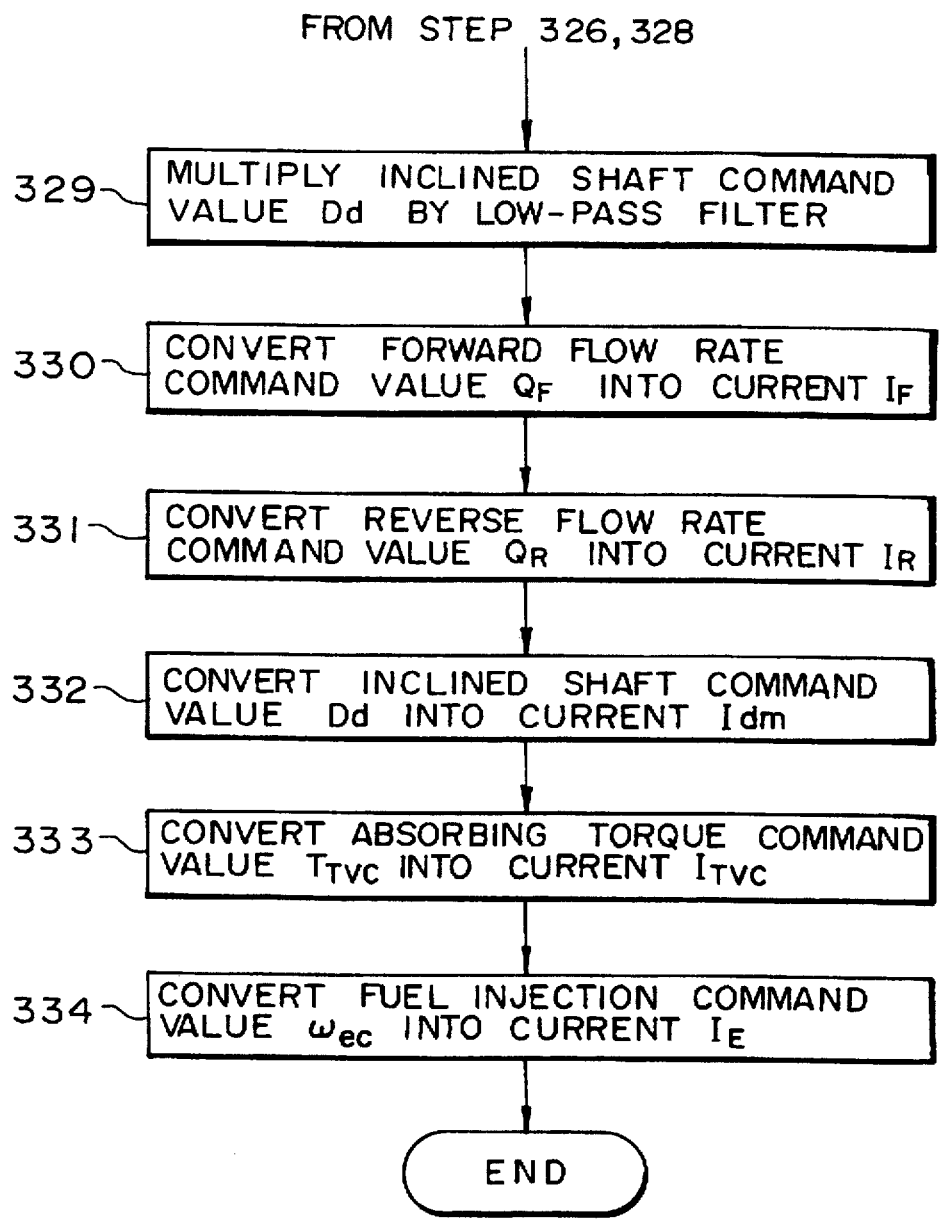

Next, in step 317 shown in FIG. 5, whether or not the shifter 63 is operated, i.e., the position of the shifter 63 is judged by the shifter selected position sensor 63a. If neutral N, the procedure advances to step 318. If forward F, the procedure advances to step 319. If reverse R, the procedure advances to step 320.

In step 318 (in the case of neutral N position), it is checked that a forward flow rate command value $Q_F$, from the control device 60 to the forward solenoid operated directional control valve 41, and a reverse flow rate command value $Q_R$ to the solenoid operated directional control valve 42 are zero. When agreed with the judgment in step 317, the procedure advances to step 321.

In step 319 (in the case of forward F position), Qa is substituted into the forward flow rate command value $Q_F$, and the reverse flow rate command value $Q_R$ is reduced to zero. Further, the pressure Pca of the forward side pipe 56 is substituted for the inlet pressure Pp so as to be used for controlling an inclined shaft of the hydraulic motor 50. When this agrees with the judgment in step 317, the procedure advances to step 321.

In step 320 (in the case of reverse R position), Qa is substituted for the reverse flow rate command value $Q_R$, and the forward flow rate command value $Q_F$ is reduced to zero. Further, the pressure Pcb of the reverse side pipe 57 is substituted into the inlet pressure Pp so as to be used for controlling the inclined shaft of the hydraulic motor 50 as in the case of forward F.

In step 321, whether the operation is in the traveling region LDD or the braking region LDB is judged from the map shown in FIG. 9. If the traveling region LDD, the procedure advances to step 322. If the braking region LDB, the procedure advances to step 327.

In step 322, an inclined shaft command value Dd of the hydraulic motor 50 for traveling is calculated. The inclined shaft command value Dd controls the inclined shaft of the hydraulic motor 50 during traveling to control discharge capacity of the hydraulic motor 50. The motor inclined shaft control will be described with FIG. 11.

Figure 11:
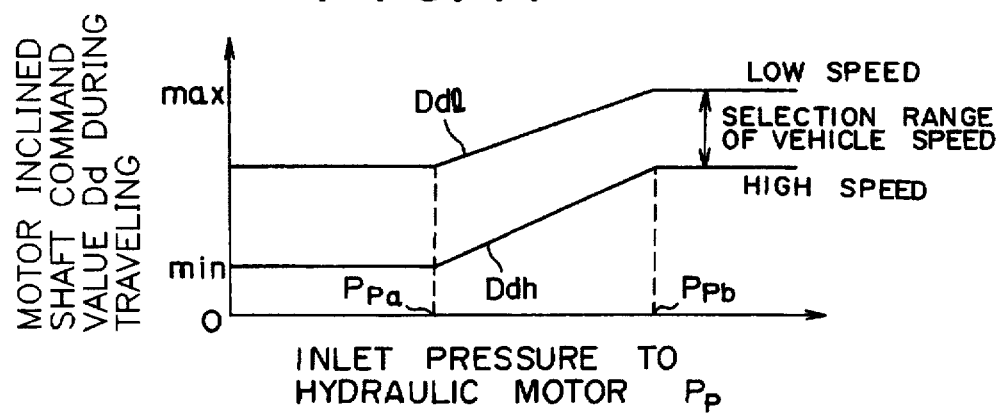

Referring to FIG. 11, the horizontal axis represents the inlet pressure Pp to the hydraulic motor 50, and the vertical axis represents the inclined shaft command value Dd of the hydraulic motor 50. The solid line Ddh shows a change of the inclined shaft command value Dd when the vehicle speed V is in a high range, and the solid line Ddl show the same when the vehicle speed V is in a low range. For example, when the vehicle speed is in the high range (the solid line Ddh), the inclined shaft command value Dd is set relatively small, and the gradient of the change is increased. In addition when the vehicle speed is in the low range (the solid line Ddl), the inclined shaft command value Dd is set relatively large, and the gradient is decreased. In addition, until the inlet pressure Pp reaches a predetermined value Ppa, the inclined shaft command value Dd maintains the minimum inclined shaft angle, and further, after the predetermined value Ppb, the inclined shaft command value Dd maintains the maximum inclined shaft angle.

In addition, based on the inlet pressure Pp, detected by the motor pressure sensors 53 and 54, and the vehicle speed Va, detected by the vehicle speed sensor 52, the inclined shaft command value Dd is obtained from the map. The control device 60 outputs the thus obtained inclined shaft command value as a command value to the motor solenoid operated directional control valve 55 of the servo device 51.

At the time of the outputting, for example, when traveling in the high speed range with a small required torque, the inclined shaft command value Dd is decreased and the gradient of the change of the inclined shaft command value Dd is increased, thereby improving the follow-up properties with respect to torque changes. In addition, when at a low speed range with the large required torque, the inclined shaft command value Dd is increased, and the gradient of the change of the inclined shaft command value Dd is decreased to prevent hunting of the hydraulic motor 50 with respect to the torque changes. Since the inclined shaft command value Dd suitably changes in response to the required torque by providing a selection range between the high speed range and the low speed range, and by providing a constant vehicle speed region, the percentage of change of the vehicle speed is reduced and a good response to the change of the vehicle speed is provided, thereby improving driving properties.

In step 323, changes in acceleration are examined. This judges whether or not the acceleration Va of the vehicle speed V is larger than a predetermined acceleration Vamax (a threshold value which can be arbitrarily set). If not, i.e., if smaller, the procedure advances to step 324. If larger, the procedure advances to step 328.

When the procedure advances to step 328, since the vehicle speed is increased greatly (descending a slope, etc.), the rotational speed of the hydraulic motor 50 changes faster than a predetermined amount. For this reason, the discharge amount from the hydraulic pump 10 cannot follow up, so the control device 60 sends a signal to the two-stage back pressure valve 23, and switches the two-stage back pressure valve 23 in step 328 in the direction in which high pressure in the return circuit is generated. When switched to the high pressure, the discharge side return oil from the hydraulic motor 50 is fed to the pipe 56 or the pipe 57, whichever is on the supply side from the hydraulic pump 10 to the motor 50, through the suction valve 31 or the suction valve 32 so as to prevent occurrence of cavitation.

In step 324, the entrance pressure of the hydraulic motor 50 is examined. This judges whether or not the supply side pressure Pd to the hydraulic motor 50 is lower than the threshold value of a predetermined pressure Pdmin. If not, i.e., higher than the threshold value, the procedure advances to step 325 because a non-illustrated vehicle is driven by the hydraulic motor 50. On the other hand, when lower than the threshold value, the procedure advances to step 328, and the two-stage back pressure valve 23 is switched in the direction in which high pressure is generated in the same manner as described above.

In step 325, the percentage of change of the accelerating amount θ is detected. An amount of change θa of the accelerating amount θ is obtained by the difference between the former accelerating amount θf and the current accelerating amount θn, and whether or not the difference θa is larger than a predetermined threshold value θdec is judged. If not larger, a change of commanded speed is considered to be small, and the procedure advances to step 326. If larger, the procedure advanced to step 328.

In step 326, the two-stage back pressure valve 23 is turned off, i.e., the two-stage back pressure valve 23 is controlled to a low pressure by the command from the control device 60, whereby return oil is mainly returned to the oil tank 6. In addition, a part of the return oil is fed to either of the supply side pipe 56 and 57 as needed through the suction valve 31 or the suction valve 32. When step 326 is completed, the procedure advances to step 329.

In step 327 to which the procedure advances in the case of the braking region LDB in the above step 321, the inclined shaft command value Dd of the hydraulic motor 50 during braking is calculated. The control of the discharge capacity of the hydraulic motor 50 during braking will be described with FIG. 12. Solid line Dbh represents the change of the inclined shaft command value Dd when a brake depression angle of the brake pedal 62 is high, and the dashed line Dbl represents the same when the brake pedal 62 is not depressed. When the vehicle speed is in the high range, the inclined shaft command value Dd is decreased, and the inclined shaft command value Dd is increased when the vehicle speed is in the low range. By this, when the vehicle speed V is in the low range, the inclined shaft command value Dd is increased, whereby a braking torque amount is increased to apply hard braking and improve follow-up properties. When the vehicle speed V is in the high range, braking is slowed down to prevent the hard braking and maintain safety. When the discharge capacity control of the hydraulic motor 50 on braking is completed, the procedure advances to step 329 via step 328.

Figure 13:
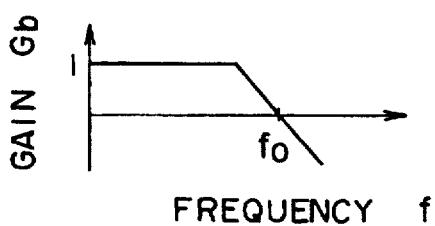

In step 329, the output of a low-pass filter shown in FIG. 13 is multiplied by the inclined shaft command value Dd on braking. This allows a command signal to the solenoid operated directional control valve 55, which generates pressure for switching the hydraulic motor 50, to pass through the low-pass filter so as to remove high-frequency noises. This is represented by Ddc=Gb×Dd in terms of a transfer function. By the low-pass filter, very small vibrations of the hydraulic motor 50 due to high frequency are prevented, thereby eliminating undesirable speed changes of the vehicle.

Figure 14:
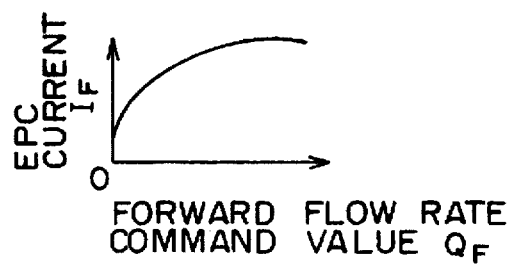
Figure 15:
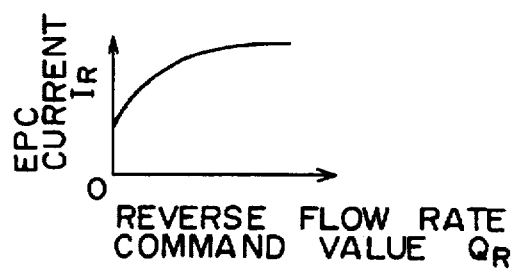

In step 330, the forward flow rate command value QF is converted into a current. In addition, in step 331, the reverse flow rate command value $Q_R$ is converted into a current. Referring to FIG. 14, the horizontal axis represents the forward flow rate command value $Q_F$, the vertical axis represents the current $I_F$ to the forward solenoid operated directional control valve 41. Referring to FIG. 15, the horizontal axis represents the reverse flow rate command value $Q_R$, and the vertical axis represents the current $I_R$ to the reverse solenoid operated directional control valve 42. Incidentally, in the vertical axes of FIG. 14 and later drawings, the current to the solenoid operated directional control valve is referred to as "EPC current".

As shown in FIG. 14 and FIG. 15, the forward current $I_F$ or the reverse current $I_R$ is changed with respect to the forward flow rate command value $Q_F$ or the reverse flow rate command value $Q_R$, and variations of the travel valve 21 and the solenoid operated directional control valves 41 and 42 are absorbed. The map is set so that the discharge capacity of the hydraulic motor 50 varies during forwarding and during reversing, and the discharge capacity during reversing is larger than during forwarding. This increases the inclined shaft command value Dd on reversing to be larger than that during forwarding to provide a larger output torque, so that escape from uneven ground, etc., is facilitated.

Figure 16:
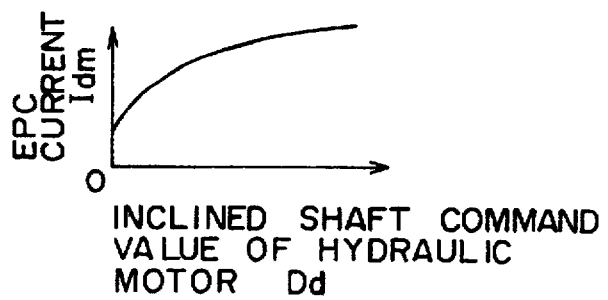

In step 332, a current conversion command value (current Idm) is obtained, according to the map shown in FIG. 16, from the inclined shaft command value Dd passing through the low-pass filter, and outputted to a solenoid operated directional control valve 55. The horizontal axis represents the inclined shaft command value Dd, and the vertical axis represents the current Idm to the solenoid operated directional control valve 55. The current Idm is changed as in the case of FIG. 14 and FIG. 15 to correct non-linearity of the hydraulic motor 50 and the solenoid operated directional control valve 55.

Figure 17:
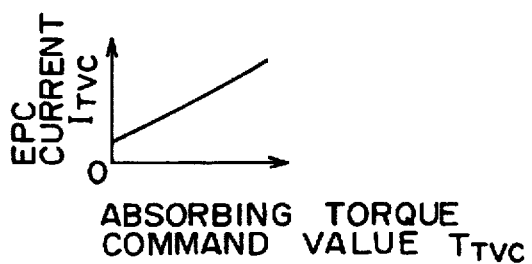

In step 333, the command signal to the TVC valve 11a obtained in step 313 is converted into a current $I_{TVC}$ according to the map shown in FIG. 17 to output a command. The horizontal axis represents the absorbing torque command value $T_{TVC}$ to the TVC valve 11a, and the vertical axis represents the current $I_{TVC}$ to the TVC valve 11a.

Figure 18:
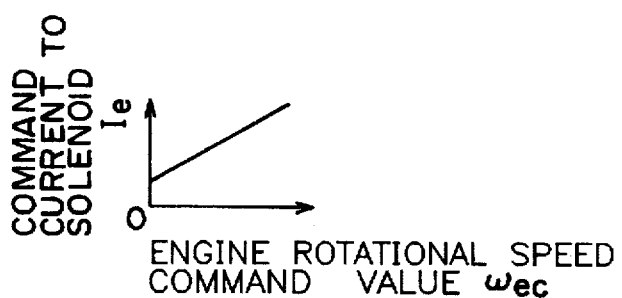

In step 334, the command signal ωec to the solenoid 2a of the fuel injection pump 2 obtained in step 314 is converted into a current $I_E$ according to the map shown in FIG. 18 to output a command. The horizontal axis represents the rotational speed command value ωec of the engine 1, and the vertical axis represents the current $I_E$ to the solenoid 2a. When step 334 is completed, the procedure returns to step 311. By the flow as described above, traveling control and braking control in the traveling mode D are effected.

Next, a description will be given of the usage of the vehicle by an operator in the traveling mode D. When only traveling for transportation, etc., is required, the operator selects the traveling mode D by the mode selection switch 64. Then, the engine 1 is started. However, in a situation where the accelerator pedal 61 is not depressed, the engine 1 is in the idling condition and rotates at a low speed, as shown in FIG. 8. When the operator operates the shifter 63 for selecting the vehicle traveling direction, and depresses the accelerator pedal 61, the vehicle will travel. At this time, the control device 60 sets the rotational speed ωe of the engine 1 by FIG. 8, the hydraulic travel pump 10 by FIG. 7, the opening degree amount of the travel valve 21 by FIG. 9, and the inclined shaft command value Dd by FIG. 11, based on the signals from the shifter selected position sensor 63a and the accelerating amount detection sensor 61a, whereby the vehicle travels at a predetermined traveling speed.

By the selection of the above-described traveling mode D, the rotational speed ωe of the engine 1 is controlled by the depressed amount of the accelerator pedal 61. In addition, at the time of a normal traveling, the opening degree amount of the travel valve 21 is in the position where the opening of the spool is in the full opening region LDF, and the resistance at the time of traveling is reduced. Further, at the time of traveling, if the speed is increased higher than that corresponding to the accelerating amount, the opening degree amount of the travel valve 21 enters the speed balance region LDD where the opening of the spool is restricted, so that the speed is controlled by the travel valve 21. However, this period of time is very short, and the opening region LDF immediately enters the braking region LDB and is controlled. When the braking region LDB is entered, the two-stage back pressure valve 23 is operated following the steps of the above flow, thereby preventing occurrence of cavitation.

Figure 12:
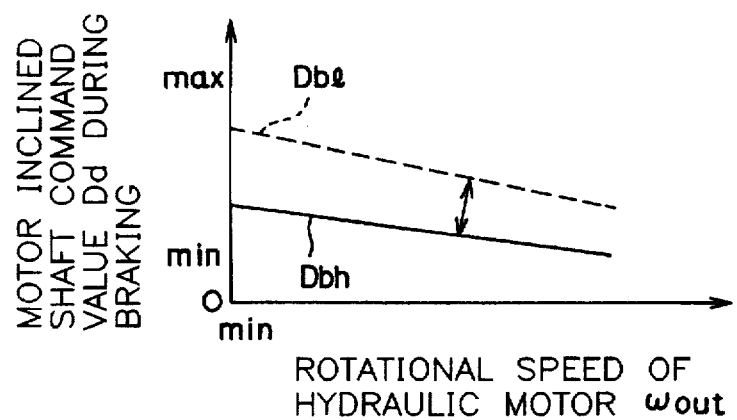

At the time of a braking operation, when the operator depresses the brake pedal 62, a signal from the braking amount detection sensor 62 enters the control device 60, and the control device 60 controls the discharge capacity of the hydraulic motor 50 in response to the depressed amount of the brake pedal 62 shown in FIG. 12 and the vehicle speed V, and applies the brake.

Next, a case will be described where the operating mode W is selected in mode selection.

First, an operating mode will be described. At the time of operation, if the mode selection switch 64 is switched to select the operating mode W, the operating mode W is detected by the mode detection sensor 64, and a signal of the operating mode W is sent to the control device 60. In the control device 60, a map of the operating mode W is accessed and judged. For example, if only the operating machine levers are operated, the operating machine CLSS valves 46a, 46b, . . . are actuated, and the flow rate of each CLSS valve and the discharge amount of the hydraulic pump 10 are controlled by the highest pressure PS in the CLSS valves. In addition, when an operating machine lever is operated while traveling, the discharge amount of the hydraulic pump 10 and the flow rate of the operating machine CLSS valve 46a and the travel valve 21 are controlled by the highest pressure which acts on the operating machine CLSS valve 46a and the travel valve 21.

Figure 3:
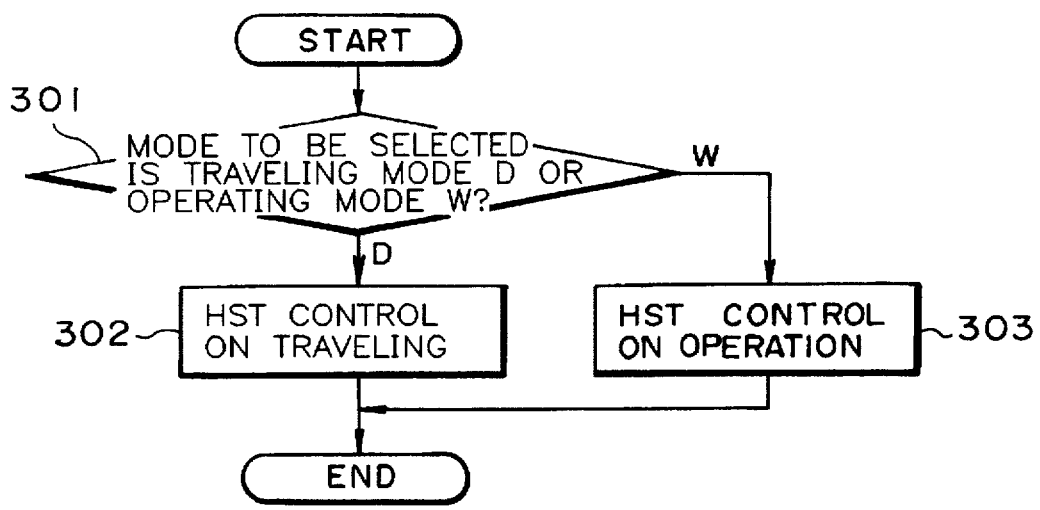
FIG. 3 is a flowchart of a mode switching of the hydraulic driving apparatus according to the first embodiment.

The hydraulic driving control when the operating mode W is selected, i.e., a case where the procedure advances to step 303 in the flow of FIG. 3, will be described with the flows of FIG. 19 to FIG. 21.

Figure 19:
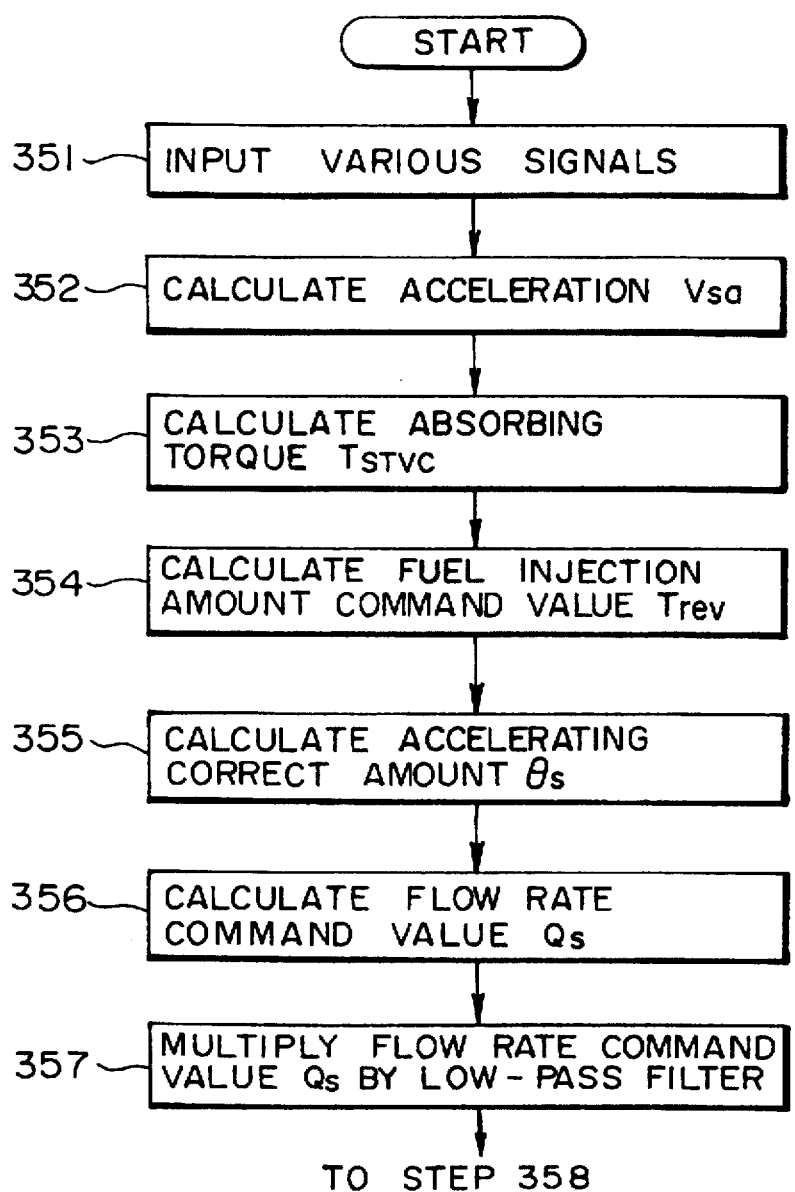
FIGS. 19 to 21 are flowcharts of a series of controls when selecting an operating mode according to the first embodiment.

Referring to FIG. 19, in step 351, various signals are inputted to the control device 60. That is, the control device 60 reads in ever-changing signals from the various sensors. The signals, as the similar signals in step 311, include a change of the position of the shifter 63 (changes of forward F, reverse R, neutral N), the engine rotational speed ωe, the accelerating amount θ, the rotational speed ωout of the hydraulic motor 50 (the vehicle speed V), the inlet and outlet pressures Ppc, and the braking capacity Rc of the retarder. In this step, an engine rotational speed setting dial Erev for setting the rotational speed of the engine 1, an operating mode selecting signal Sv for setting outputs of the operating machine, a heavy digging mode, a digging mode, and a fine operating mode, etc., according to the desired works are further inputted.

In step 352, similar to step 312, an acceleration Vsa of the vehicle is calculated from the change of the vehicle speed V in the operating mode W. This calculation is made by subtracting the former ωout1 from the current ωout2, and is represented by the following expression:

$$Vsa = \Delta\omega wout = \omega out2 - \omega out1$$

In step 353, an absorbing torque $T_{STVC}$ of the hydraulic pump 10 in the operating mode W is calculated. This is effected in such a manner that the absorbing torque of the hydraulic pump 10 is obtained from the engine rotational speed ωe, the engine rotational speed setting dial Erev, and the operating mode selecting signal Sv, based on a map shown in FIG. 22. The obtained absorbing torque $T_{STVC}$ is outputted as a command signal from the control device 60 to the TVC valve 11a.

Figure 22:
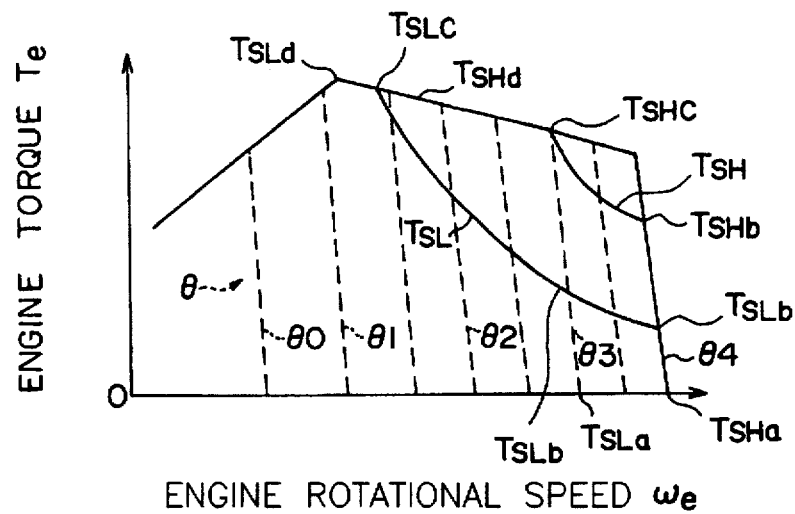
FIGS. 22 to 34 are diagrams in the operating mode according to the first embodiment.

The absorbing torque control of the hydraulic pump 10 in this case will be described. Referring to FIG. 22, the horizontal axis, the vertical axis, and the accelerating amount of dotted lines are the same as those of FIG. 7. The solid lines of hyperbolas represent the absorbing torque in the operating mode W from the operating mode selecting signal Sv, high absorbing torque in a heavy cutting mode is represented by a solid line $T_{SH}$, the change of the absorbing torque of the TVC when the absorbing toque is low in the fine operating mode is represented by a solid line $T_{SL}$. Upon receipt of the vehicle speed V of the vehicle from the vehicle speed sensor 52, the engine rotational speed ωe from the engine rotational speed sensor 3, and the operating mode selecting signal Sv, the control device 60 outputs a command to the TVC valve 11a so that the pump discharge amount× the discharge pressure changes as predetermined in response to the engine rotational speed ωe.

For example, when the operator selects the heavy cutting mode by the mode selection switch 64, the operating mode selecting signal Sv of the heavy cutting mode is sent to the control device 60 from the mode detection sensor 64a, whereby the control device 60 selects the solid line $T_{SH}$ of high absorbing torque from a non-illustrated storage device. At this time, when the operator sets the engine rotational speed setting dial Erev to the position of the accelerating amount $\omega_4$=Full, the control device 60 selects the dotted and slanting line of the accelerating amount $\theta_4$=Full from the storage device. Sequentially, when a non-illustrated operating machine lever is operated, an operating machine solenoid operated directional control valve (not shown) is actuated upon receipt of a signal from the control device 60 in response to an operating amount so as to switch the operating machine CLSS valve 46a.

In accordance with the actuation, pressure from the TVC valve 11a is sent to the servo 11c so that the LS differential pressure (PLS=PP−PS) is held constant, and the inclination-rotation angle (discharge amount of the pump) of the hydraulic pump 10 is controlled. When the operating amount is increased and the discharge amount of the pump is increased, or when the pressure applied to the hydraulic pump 10 is increased due to a load increase of the operating machine, the absorbing torque $T_{TVC}$ of the hydraulic pump 10 reaches a torque curve $T_SH$, and varies along the torque curves $T_{SHa}$, $T_{SHb}$, $T_{SHc}$, and $T_{SHd}$. That is, the absorbing torque $T_{TVC}$ moves sequentially on the solid lines along the points ($T_{SHa}$, $T_{SHb}$, $T_{SHc}$, and $T_{SHd}$) in response to the load and the engine rotational speed ωe.

In contrast, when the operator sets the engine rotational speed setting dial Erev to the position of the accelerating amount $\theta_3$=¾ by the mode selection switch 64, and selects the fine operating mode, the absorbing torque $T_{TVC}$ sequentially moves on the solid lines along the points ($T_{SLa}$, $T_{SLb}$, $T_{SLc}$, and $T_{SLd}$) in response to the load and the engine rotational speed ωe. This reduces the absorbing torque $T_{TVC}$ of the hydraulic pump 10 to be smaller than the absorbing toque in the heavy cutting mode, and requires less engine torque, so that a reduction in fuel economy can be achieved.

In addition, as the hydraulic pump 10, one variable displacement hydraulic pump is used. The hydraulic pump 10 sends pressurized oil to actuators for driving the hydraulic driving apparatus for a vehicle and an operating machine so as to drive each of them, and controls them so that the discharge amount falls within the predetermined range in response to the rotational speed of the hydraulic motor 50 and the engine. By this, in the vehicle having the operating machine, one hydraulic pump 10 is used for both operating machine and traveling, whereby the space and cost of the vehicle can be reduced.

Figure 23:
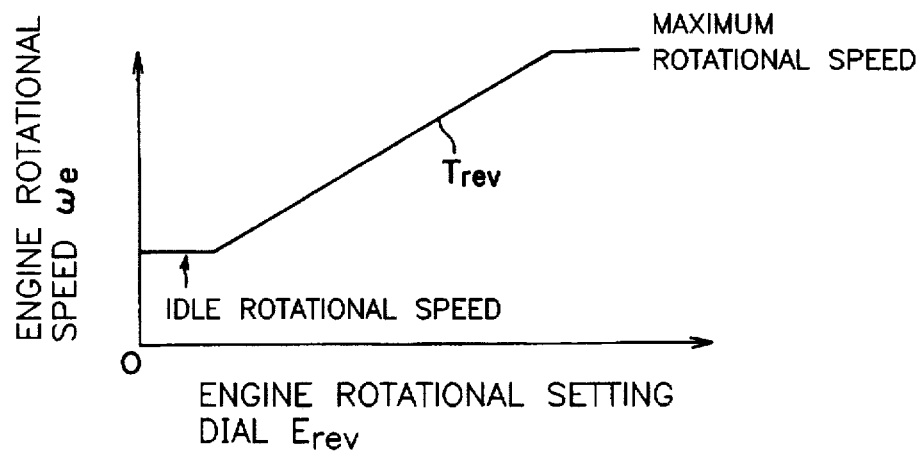

In step 354, a fuel injection amount command value of the engine 1 in the operating mode W is calculated. Here, the control device 60 obtains the engine rotational speed ωe from the engine rotational speed setting dial Erev according to a map shown in FIG. 23, and outputs a command signal to the solenoid 2a which controls the engine rotational speed ωe. Referring to FIG. 23, a solid line Trev (fuel injection amount command value Trev) represents the lineal change of the engine rotational speed from the idle rotational speed to the maximum rotational speed.

For example, when the operator wishes to operate the operating machine quickly for the heavy cutting, the engine rotational speed setting dial Erev is set to the maximum rotational speed (full-throttle position). On the other hand, when the operator wishes to operate the operating machine slowly in the fine operation, the engine rotational speed setting dial Erev is set near the idle rotational speed. This allows the engine 1 to rotate corresponding to the operating amount of the engine rotational speed setting dial Erev. Incidentally, according to this embodiment, the control of the engine rotational speed we during the operating mode W, i.e., the fuel injection amount command value of the engine is set by the operating amount of the engine rotational speed setting dial Erev rather than the operating amount of the accelerator pedal 62.

Figure 24:
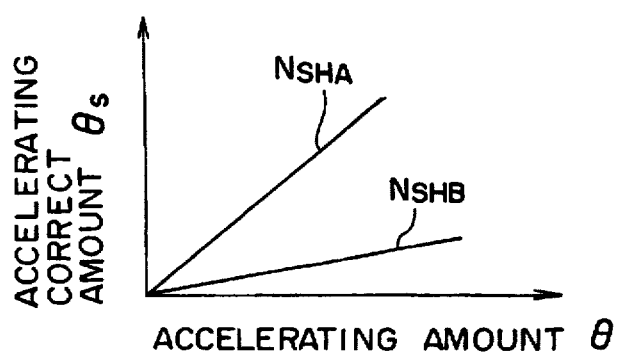

In step 355, a correction of the accelerating amount θ is obtained. This is effected in such a manner that an accelerating correction amount θs is obtained from the accelerating amount θ according to FIG. 24, and a command signal is outputted from the control device 60 to the solenoid 2a of the fuel injection pump 2, which controls the engine rotational speed ωe. FIG. 24 shows the relationship between the accelerating amount θ and the accelerating correction amount θs in each engine rotational speed ωe, and a solid line $N_{SHA}$ represents the maximum rotational speed of the engine 1, and a solid line $N_{SHB}$ represents the idle rotational speed. In this embodiment, the accelerating correction amount θs is changed corresponding to the engine rotational speed ωe with respect to the same accelerating amount θ, and the accelerating correction amount θs at the idle rotational speed is smaller than at the maximum rotational speed.

The correction will be described. Since the flow rate is determined by the opening amount of the travel valve (closed center load sensing valve) 21 regardless of the discharge amount of the hydraulic pump 10, the opening amount is fixed and the flow rate is also fixed in the same accelerating amount θ. For this reason, if the opening amount for forwarding the vehicle at slow speed is set, the opening amount cannot be increased and the traveling speed is slow when a normal speed traveling is required. To solve this, according to this embodiment, the opening amount is increased to the normal speed, and the opening amount can be decreased when a slow speed forwarding is required. Therefore, the accelerating correction amount θs, corrected with respect to the accelerating amount θ, is set so as to output a small command.

Figure 25:
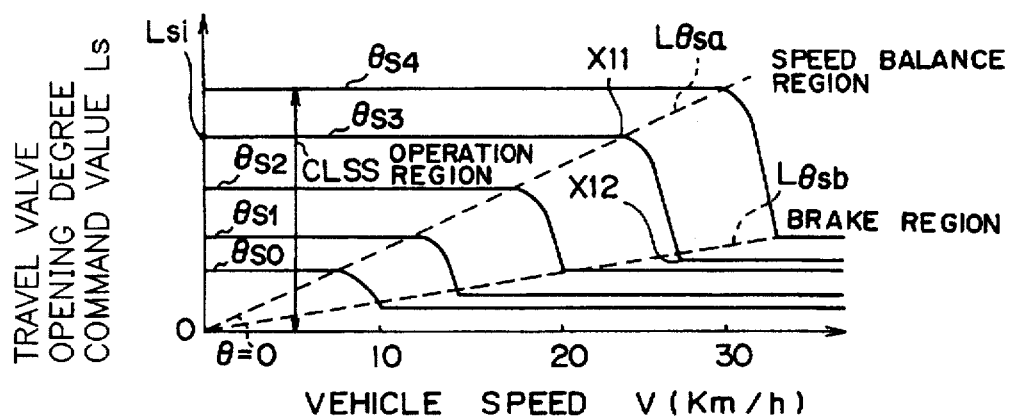

In step 356, the control device 60 calculates the flow rate command value Qs of the travel valve 21 (the opening degree command value Ls of the travel valve 21) during the operating mode W according to a map shown in FIG. 25 from the accelerating amount θ and the motor rotational speed ωout (the vehicle speed V of the vehicle), and outputs a command signal to the solenoid operated directional control valves 41 and 42 for controlling the flow rate Qs. Referring to FIG. 25, which illustrates the opening degree control of the travel valve 21, the horizontal axis represents the vehicle speed V, and the vertical axis represents the opening degree command value Ls (the flow rate command value Qs) of the travel valve 21. In addition, a solid line substantially parallel to the horizontal axis represents the accelerating correction amount θs ($θs_0=0$, $θs_1=¼$ Full, $θS_2=⅔$ Full, $θS_3=¾$ Full, $θS_4=$Full). The upper side of the dotted line Lθsa represents the traveling region LDD, the lower side of the dotted line Lθsb represents the braking region LDB, and a portion between the dotted line Lθsa and the dotted line Lθsb represents the speed balance region.

Referring to FIG. 25, upon receipt of the vehicle speed V from the vehicle speed sensor 52 and the accelerating amount θ from the accelerating amount detection sensor 61a, the control device 60 obtains the accelerating correction amount θs responsive to the accelerating amount θ. And, until the dotted line Lθsa where the vehicle speed reaches the predetermined vehicle speed V, the control device 60 performs the above-described CLSS control (the flow rate control responsive to the opening degree amount of the travel valve 21) in response to the accelerating correction amount θ. In addition, at the predetermined vehicle speed V or higher, the control device 60 decreases the opening degree command value Ls to the travel valve 21 even if the accelerating correction amounts θs are equal. Therefore, at a vehicle speed above the dotted line Lθsa, the speed balance region is provided. In addition, even if the accelerating correction amounts θs are equal, the braking region LDB is provided at a vehicle speed above the dotted line Lθsb, and the braking region LDB is changed gradually in accordance with the accelerating correction amount θs.

In the above-described traveling region LDD, the control device 60 outputs the opening degree command value Ls from the corrected accelerating correction amount θs and the vehicle speed V to the solenoid operated directional control valve 41 or 42, and controls to effect the CLSS control. In the braking region LDB, the control device 60 changes the opening degree command value Ls (=flow rate command value Qs=Ks·Ls) in accordance with the corrected accelerating correction amount θs. In this range, the opening degree command value Ls is not closed, and the higher the speed, the more the opening degree command value Ls is increased. Thus, even if the brake is applied, the vehicle does not stop suddenly, but suitably reduces speed.

In the speed balance region, the control device 60, similar to the traveling region LDD, outputs the opening degree command value Ls, and controls so that the opening amount of the travel valve 21 is decreased. At this control, the control device 60 outputs a command to the solenoid operated directional control valve 55 of the hydraulic motor 50 along from the parallel solid line of the accelerating correction amount θs to the solid line off to the lower left. By the command, the inclined shaft command value Dsm of the hydraulic motor 50 is varied to change the capacity of the hydraulic motor 50. Further, at $θ_{s0}$ or less, similar to the above-description, a creep traveling is performed.

The above-described operation is, for example, performed-in such a manner that the operator sets the engine rotational speed ωe to θ=¾ Full by the engine rotational speed setting dial Erev, and operates the operating lever of the operating machine and the accelerator pedal 61 to effect a simultaneous operation of the operating machine and the traveling. At the position where the accelerating correction amount θs is on the position of point Lsi of the $θ_{S3}$ and the vehicle speed V=0 with respect to the accelerating amount θ, the operating machine CLSS control is performed. The CLSS control is performed such that the operating machine CLSS valves 46a, 46b, ... are actuated by a non-illustrated operating lever, and the flow rates of each of the operating machine CLSS valves are controlled by the highest pressure PS in the CLSS valves. At this time, a discharge flow rate Qsn of the hydraulic pump 10 is the total of the operating amounts of the operating lever.

In a section between the position exceeding the vehicle speed V=0 and point X11 of the dotted line Lθsa, the operating machine is operated while traveling, and the flow rates of the operating machine CLSS valve 46a and the travel valve 21 are controlled by the highest pressure. That is, the flow rate command value Lsi responsive to the vehicle speed V and $θ_{S3}$ of the accelerating correction amount θs is outputted to the travel valve 21. The discharge flow rate of the hydraulic pump 10 at this time is the total flow rate Qsn (Qsn=Qsa+Qsb+Qsc+Qsc, ...) of the flow rate Qsa responsive to the accelerating correction amount θs and the vehicle speed V, and the flow rates (Qsb, Qsc, ...) responsive to the operating amounts of each of the operating levers.

In a section between point X11 of the dotted line Lθsa and point X12 of the dotted line Lθsb, the operating machine is also operated while traveling, but this section is the speed balance region where the discharge amount from the hydraulic pump 10 is insufficient for performing simultaneous operation. In this speed balance region, supply to the operating machine takes priority. For this reason, the flow rates consistent with the opening amount are provided to the operating machine CLSS valves 46a, 46b, ..., but the travel valve 21 of the hydraulic motor 50 enters the speed balance region.

Here, the control device 60 outputs a command signal to the solenoid operated directional control valve 41 or 42 from the accelerating correction amount θs and the vehicle speed V, and controls the opening degree command value Ls on line $θ_{S3}$ from a parallel portion of the solid line diagonally to the lower right. In addition, the control device 60 outputs a command to the solenoid operated directional control valve 55 of the hydraulic motor 50 on line $θ_{S3}$ from the parallel portion of the solid line diagonally to the lower right, and varies the inclined shaft command value Dsm to change the capacity of the hydraulic motor 50. These allow the operating machine to operate at a speed consistent with the operating amount, and allow the traveling speed to be lower than the operating amount, whereby the simultaneous operation is effected. The braking region LDB above point X12 is similar to that described above.

Figure 26:
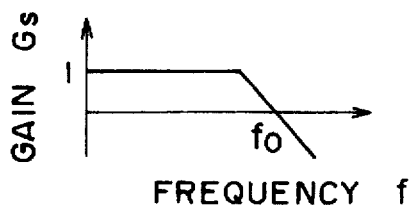

In step 357, the output of a low-pass filter, shown in FIG. 26, is multiplied by the opening degree command value Ls (the flow rate command value Qs) of the travel valve 21 during the operating mode W, whereby command signals to the solenoid operated directional control valves 41 and 42 have removed therefrom high-frequency noises of f0 and higher (transfer function: Qsa=Gsa×Qs). The vertical axis represents a gain Gsa. This eliminates the undesired speed changes of the vehicle due to vibrations of the travel valve 21, similar to step 316.

Figure 20:
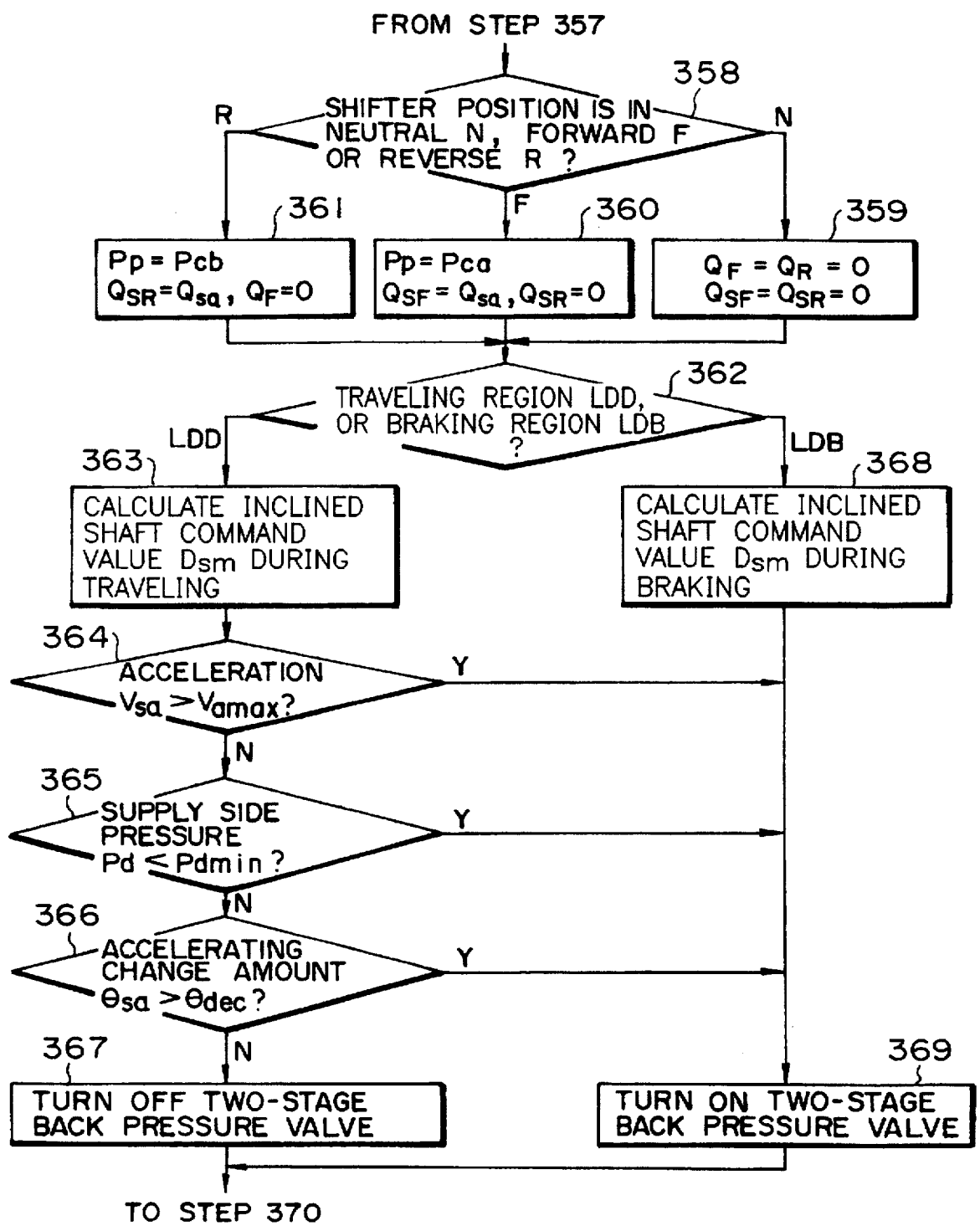
Figure 21:
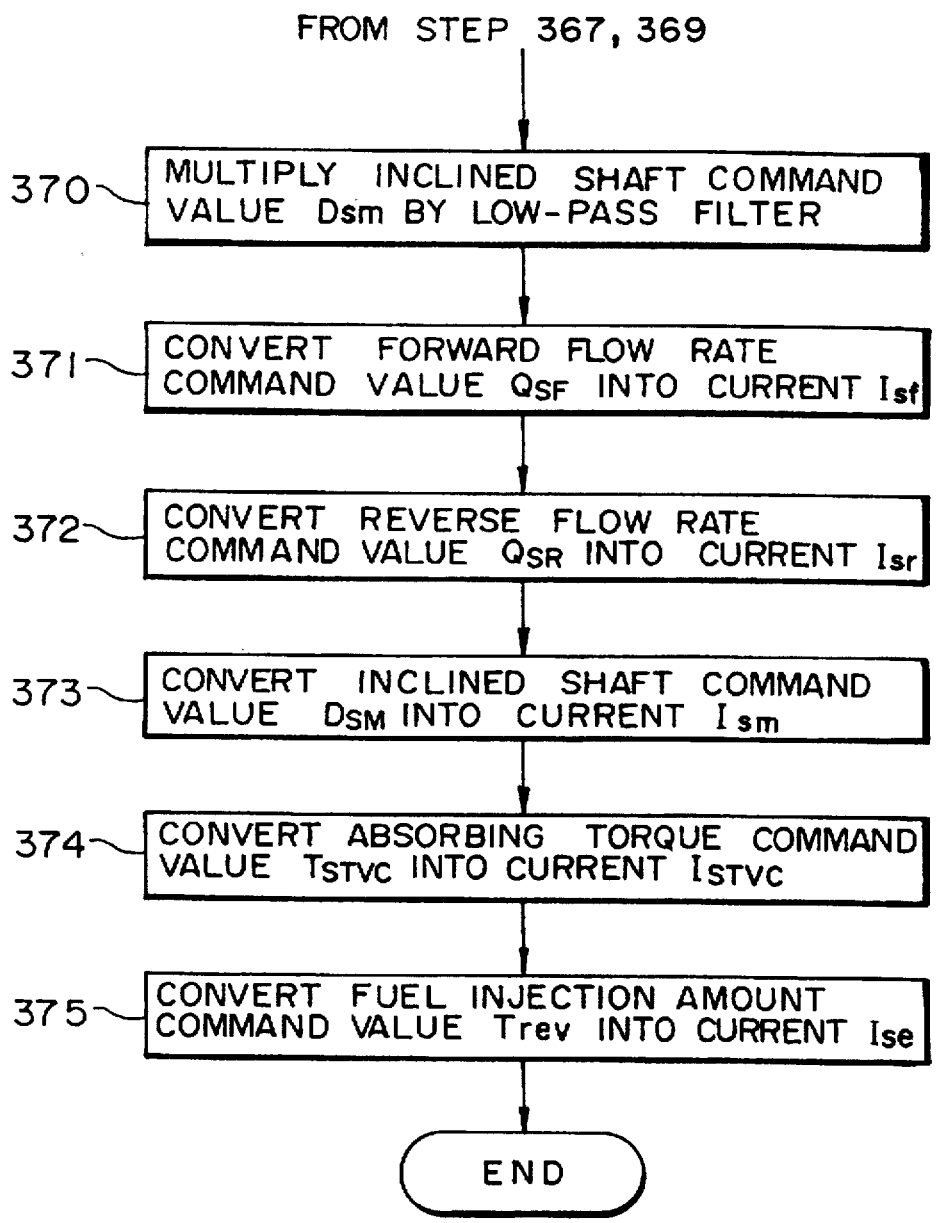

In step 358 shown in FIG. 20, the position of the shifter 63 is judged. When neutral N, the procedure advances to step 359. When forward F, the procedure advances to step 360. When reverse R, the procedure advances to step 361. In the case of neutral N position, it is checked that a forward flow rate command value $Q_{SF}$, to the forward solenoid operated directional control valve 41, and a reverse flow rate command value $Q_{SR}$, to the reverse solenoid operated directional control valve 42, are zero. When agreed with the judgment in step 358, the procedure advances to step 362.

In step 360, Qsa is substituted into the forward flow rate command value $Q_{SF}$ to the solenoid operated directional control valve 41, and the reverse flow rate command value $Q_{SF}$ to the solenoid operated directional control valve 42 is reduced to zero. Further, the pressure Pca of the forward side pipe 56 is substituted into the inlet pressure Pp, and the procedure advances to step 362. In addition, in step 361, Qsa is substituted into the reverse flow rate command value $Q_{SR}$ to the solenoid operated directional control valve 41, and the forward flow rate command value $Q_{SF}$ to the solenoid operated directional control valve 41 is reduced to zero. Further, the pressure Pcb of the reverse side pipe 57 is substituted into the inlet pressure Pp, and the procedure advances to step 362.

Figure 27:
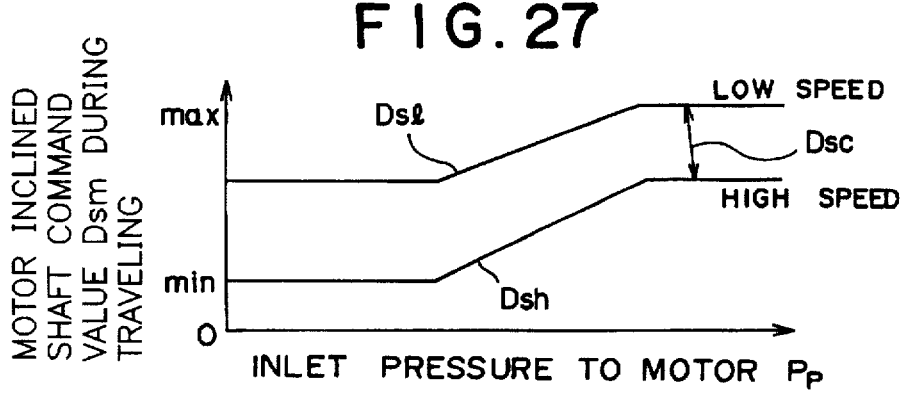

In step 362, whether the traveling region LDD or the braking region LDB is judged. That is, in FIG. 25, if the accelerating correction amount θs and the rotational speed ωout of the hydraulic motor are above the dotted line Lθsa, it is the traveling region LDD, while it is the braking region LDB if they are below the dotted line Lθsb. When the traveling region LDD, the procedure advances to step 363 to calculate the inclined shaft command value Dsm, which controls the discharge capacity of the hydraulic motor 50 during traveling in the operating mode W, according to a map shown in FIG. 27. This control is similar to that of step 322.

In step 364, similar to step 323, it is judged whether or not the acceleration Vsa of the vehicle speed V is larger than the predetermined acceleration Vamax (threshold value). In the next step 365, similar to step 324, it is judged whether or not the supply side pressure Pd to the hydraulic motor 50 during the operating mode W is lower than the predetermined pressure Pdmin.

Figure 29:
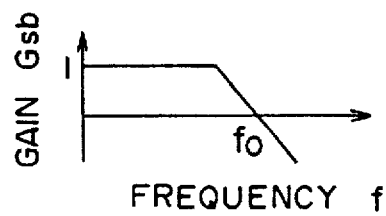

In step 366, the amount of change θsa (the difference between the former accelerating amount θsf and the current accelerating amount θsn) of the accelerating correction amount θs during the operating mode W is obtained, and whether or not the amount of change θsa is larger than a predetermined threshold value θdec is judged. If larger, the procedure advances to step 369 to switch on the two-stage back pressure valve 23, similar to step 328. If smaller, the procedure advances to step 367 to turn off the two-stage back pressure valve 23, and then the procedure advances to step 370. In step 370, the output of a low-pass filter shown in FIG. 29 is multiplied by the inclined shaft command value Dsm of the hydraulic motor 50 during the operating mode W (transfer function: Dsc=Gsb×Dsm).

Figure 28:
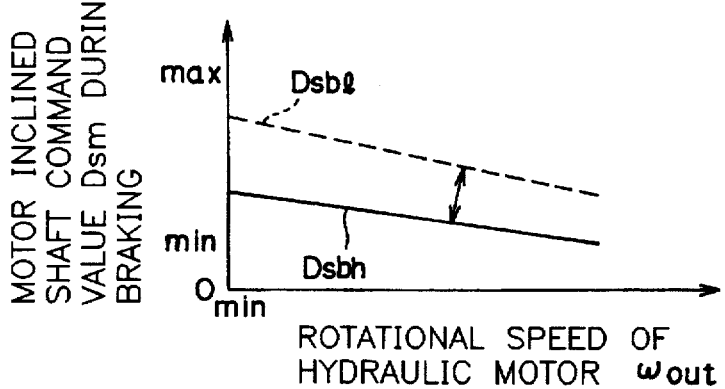

When the braking region LDB is judged in step 362, the procedure advances to step 368 to calculate the inclined shaft command value Dsm, which controls the discharge capacity of the hydraulic motor 50 during braking in the operating mode W, by FIG. 28. After calculating, the procedure advances to step 369 to switch the two-stage back pressure valve 23, and then the procedure advances to step 370.

Figure 30:
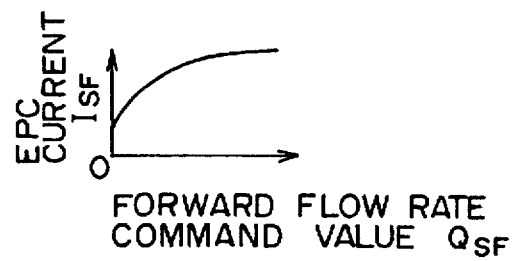
Figure 31:
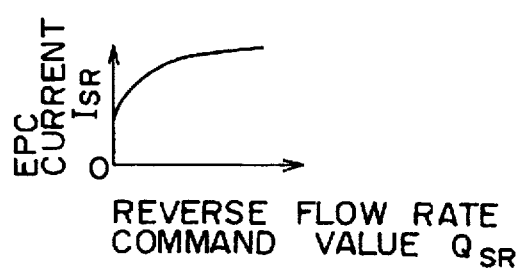
Figure 32:
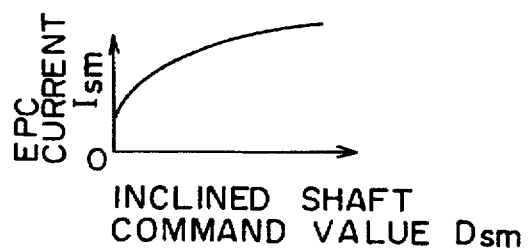
Figure 33:
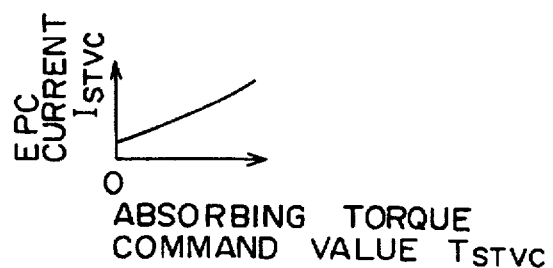
Figure 34:
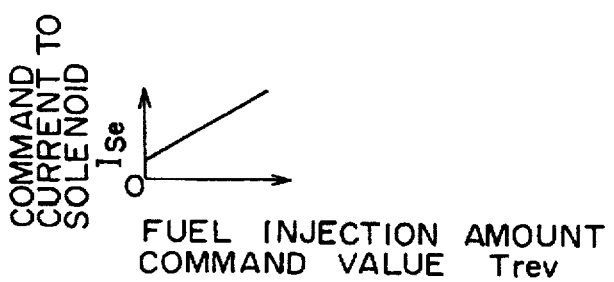

Step 371 to step 375 during the operating mode W are effected in the same manner as step 330 to step 334 during the traveling mode D. That is, in step 371, the forward flow rate command value $Q_{SF}$ is converted into a current Isf according to the map of FIG. 30, and in step 372, the reverse flow rate command value $Q_{SR}$ is converted into a current Isr according to the map of FIG. 31. In step 373, the inclined shaft command value Dsm after the low-pass filter is converted into a current Ism according to the map of FIG. 32, and in step 374, the pump absorbing torque command value $T_{STVC}$ (step 353) is converted into a current IsTVC according to the map of FIG. 33. In step 375, the command signal Trev (the fuel injection amount command value Trev, step 354) to the solenoid 2a is converted into a current Ise according to the map of FIG. 34, and when step 375 is completed, the procedure returns to step 351.

The operation when the vehicle is used in the operating mode W will be described. When performing an operation of loading or transporting cargo on board, and/or traveling, the operator selects the operating mode W by the mode selection switch 64. Next, when the engine 1 is actuated, and the rotational speed is set by the engine rotational speed setting dial 66, the engine 1 starts a constant rotation. When the vehicle is operated on a fixed position, each of the actuators are controlled at the highest pressure supplied to each of the actuators by the operating lever for the operating machine, and the amount of pressurized oil supplied to each of the actuators is determined by the operating amount of the operation lever for the operating machine. Further, as the discharge amount of the hydraulic pump, the total of the operating amount of each of the operating levers is discharged.

When performing traveling such as transportation while hoisting the operating machine, the engine 1 is at the set constant rotation. At this time, when the shifter 63 for selecting the vehicle traveling direction is operated and the accelerator pedal 61 is depressed, the vehicle will travel. However, the engine 1 may rotate at high speed and at middle speed. For this reason, when the rotational speed of the engine 1 is low, correction of an accelerator shown in FIG. 24 is effected so that the vehicle speed responsive to the accelerating amount becomes lower than the high rotational speed of the engine 1. At this time, the engine 1 is rotating at an initially set rotational speed regardless of the accelerator pedal 61. In addition, when the discharge amount of the hydraulic pump 10 is insufficient, supply to an operating machine circuit takes priority. The discharge amount from the hydraulic pump 10 is controlled by the highest pressure in the CLSS valves for each of the operating machines and the travel valve 21. In addition, the amounts of pressurized oil supplied to each of the actuators and the travel valve 21 are controlled as in the case when the vehicle is operated at a fixed position. The discharge amount of the hydraulic pump is, similar to the fixed position operation, the total of the operating amounts of each of the operating levers for the operating machines. The operation during operating the brake is similar to that during the traveling mode, but different in that a variable of the accelerating amount in the traveling mode is replaced with the accelerating correction amount.

Figure 35:
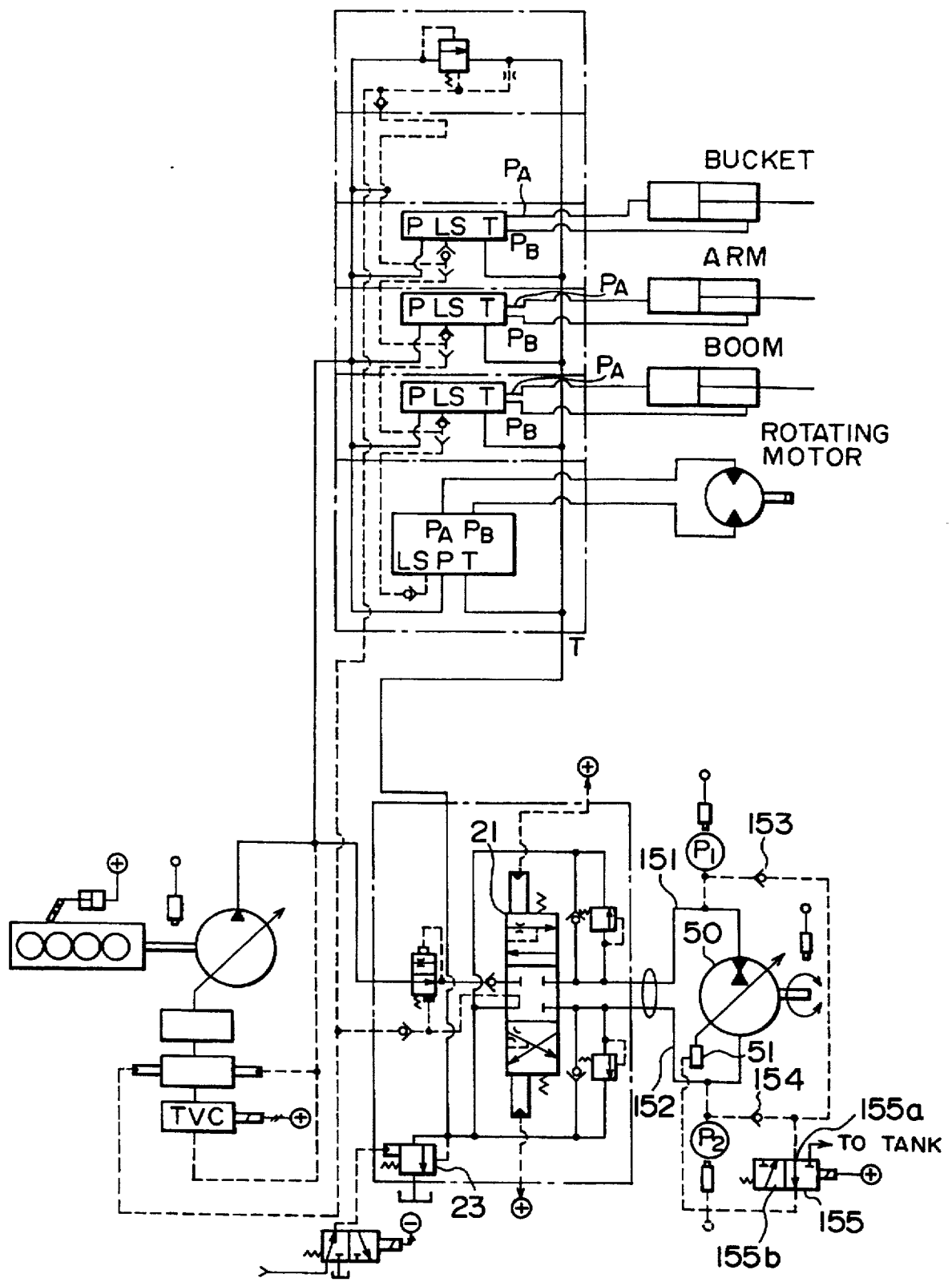
FIG. 35 is a hydraulic circuit diagram of a speed changing device for a hydraulic driving apparatus according to a second embodiment of the present invention.

Next, a second embodiment of the present invention will be described. The second embodiment differs from the first embodiment in the following point. That is, according to FIG. 2 of the first embodiment, the solenoid operated directional control valve 55 for the hydraulic motor 50 is switched by the command from the control device 60, and the pressure of the pilot pump acts on the servo device 51 by this switching, and the servo device 51 controls the swash plate, etc., to allow displacement of the hydraulic motor 50 to be variable. In contrast, according to FIG. 35 showing the second embodiment, oil pressure from pipes 151 and 152 of inlet and outlet ports of the hydraulic motor 50 is supplied to the servo device 51 via check valves 153 and 154 and a solenoid operated directional control valve 155. This supply controls the swash plate, etc., which allows the displacement of the hydraulic motor 50 to be variable, similar to the first embodiment. The solenoid operated directional control valve 155 is, similarly, switched by the command from the control device 60.

Next, an operation will be described. During a normal operation, the solenoid operated directional control valve 155 is switched to a position 155a to supply oil pressure from the pipes 151 and 152 of the inlet and outlet ports of the hydraulic motor 50 to the servo device 51. By this, when the pressure acting on the hydraulic motor 50 is high, the pressure to be applied to the servo device 51 is increased, and the inclined shaft angle of the hydraulic motor 50 is enlarged, thereby outputting higher torque. On the other hand, when the pressure acting on the hydraulic motor 50 is low, the pressure applied to the servo device 51 is decreased and the inclined shaft angle of the hydraulic motor 50 is reduced, thereby outputting high rotational speed.

In addition, when the brake is operated, the control device 60 detects that the vehicle is in the braking region LDB shown in FIG. 9 or FIG. 25, and outputs a command to the solenoid operated directional control valve 155. This command switches the solenoid operated directional control valve 155 to a position 155b, whereby the servo device 51 is connected to the tank 6. Even if the pressure acting on the hydraulic motor 50 changes, this offers a predetermined constant pressure of the servo device 50 without any changes, so that the operation of the servo device 51, which controls the swash plate, etc., is shut down. For this reason, a braking force is fixed, and the operation is facilitated.

Figure 36:
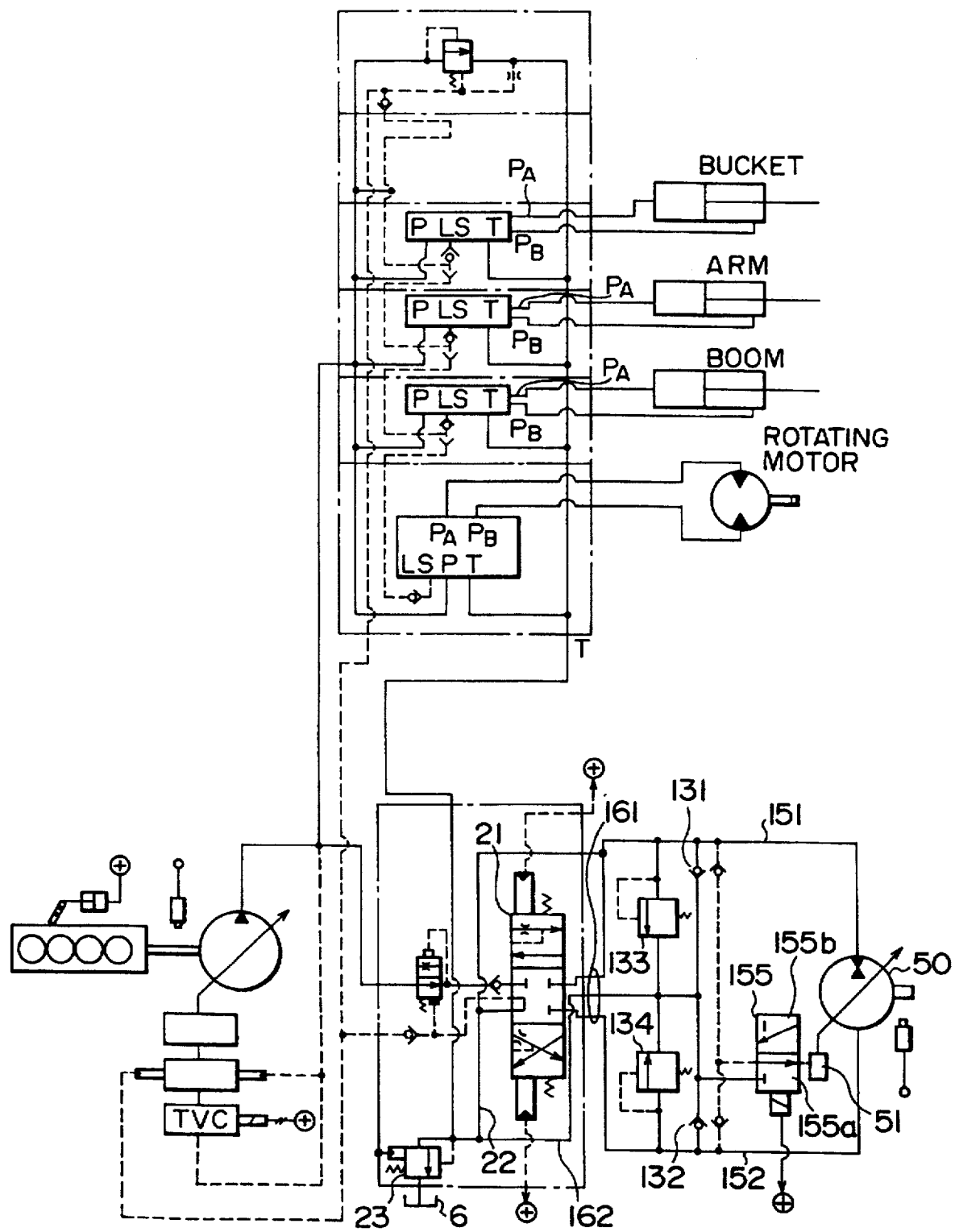
FIG. 36 is a hydraulic circuit diagram of a speed changing device for a hydraulic driving apparatus according to a third embodiment of the present invention.
Figure 37:
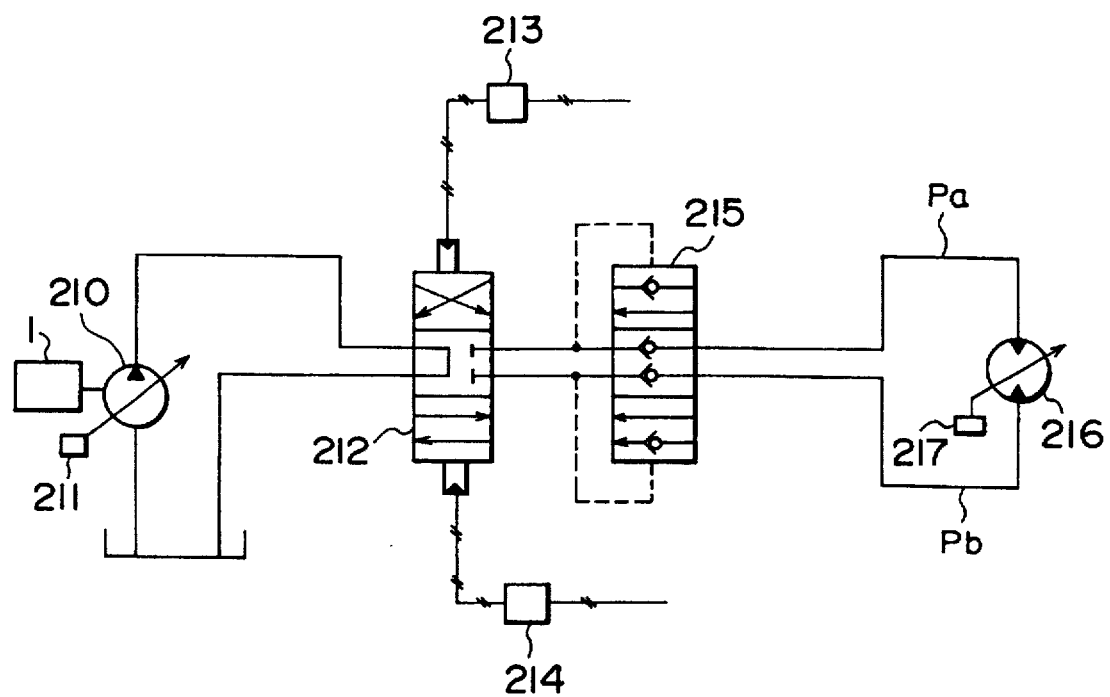
FIG. 37 is a schematic hydraulic circuit diagram showing a speed changing device for a hydraulic driving apparatus using a counterbalance valve according to the prior art.

Then, a third embodiment of the present invention will be described with FIG. 36.

This embodiment differs from the second embodiment of FIG. 35 in the following points. That is, a swivel joint 161 is provided between the travel valve 21 and the hydraulic motor 50. In addition, to the return circuit from the travel valve 21 to the tank 6, a pipe 162 branched between the travel valve 21 and the two-stage back pressure valve 13 is connected. The pipe 162 is connected to suction valves 131 and 132 and safety valves 133 and 134 via the swivel joint 161.

According to such a construction, working fluid from the safety valves 133 and 134 is returned to the suction valves 131 and 132 at the upstream side (the side of the suction valves) of the swivel joint 161. This eliminates occurrence of cavitation. In addition, the number of pipes in the vehicle including an upper turning body can be reduced, so that the diameter of the pipe can be enlarged, and cavitation can be effectively prevented.

Industrial Applicability

The present invention is useful as a method of controlling a speed change of a hydraulic driving apparatus for a vehicle and a speed changing device which provides good follow-up properties with respect to the engine and the torque amount change, and which can prevent hunting during low vehicle speed and provide good operability and traveling efficiency.

We claim:

1. A method of controlling a speed change of a hydraulic driving apparatus for a vehicle having an engine, said method comprising the steps of:

operating a shifter to select forward traveling or reverse traveling of the vehicle;

changing a rotational speed of the engine by an accelerating amount;

driving a hydraulic pump by an output of the engine so as to supply pressurized oil from the hydraulic pump through a directional control valve to a supply side of a hydraulic motor, for effecting traveling of the vehicle, to control a rotational speed of the hydraulic motor; and controlling the hydraulic driving apparatus;

wherein the step of controlling the hydraulic driving apparatus comprises at least one of the following nine sets of steps:

(A) discriminating, from the accelerating amount and the rotational speed of the hydraulic motor, between a powering travel of the vehicle and a braking travel of the vehicle; and when a powering travel is discriminated, opening fully the directional control valve in response to the rotational speed of the hydraulic motor and the accelerating amount, thereby reducing resistance of the directional control valve;

(B) discriminating, from the accelerating amount and the rotational speed of the hydraulic motor, between a powering travel of the vehicle and a braking travel of the vehicle;

when a braking travel is discriminated and the accelerating amount is in a relatively low range, opening the directional control valve only a first predetermined amount in response to the rotational speed of the hydraulic motor and the accelerating amount; and when a braking travel is discriminated and the accelerating amount is in a relatively high range, opening the directional control valve only a second predetermined amount in response to the rotational speed of the hydraulic motor and the accelerating amount, said second predetermined amount being greater than said first predetermined amount;

(C) discriminating, from the accelerating amount and the rotational speed of the hydraulic motor, between a powering travel and a braking travel; and when a braking travel is discriminated, allowing oil, returning from the hydraulic motor toward a tank, to have a high pressure so as to be fed to the supply side of the hydraulic motor if an inlet pressure to the hydraulic motor is lower than a permissible suction pressure of the hydraulic motor;

(D) controlling absorbing torque of the hydraulic pump within a predetermined range in response to the rotational speed of the hydraulic motor and the rotational speed of the engine;

wherein the step of controlling absorbing torque comprises:

decreasing the absorbing torque of the hydraulic pump if the vehicle speed is in a high range; and increasing the absorbing torque of the hydraulic pump if the vehicle speed is in a low range;

(E) controlling the rotational speed of the engine within a predetermined range in response to the accelerating amount and the rotational speed of said hydraulic motor;

wherein the step of controlling the rotational speed of the engine comprises:

increasing the rotational speed of the engine so that the gradient of the change of the rotational speed of the engine is increased if the vehicle speed is in a high range, and decreasing the rotational speed of the engine so that the gradient of the change of the rotational speed of the engine is decreased if the vehicle speed is in a low range;

(F) controlling a discharge capacity of the hydraulic motor in response to the rotational speed of the hydraulic motor and a supply side pressure of the hydraulic motor;

wherein the step of controlling a discharge capacity of the hydraulic motor comprises:

controlling the discharge capacity of the hydraulic motor so as to decrease the discharge capacity and increase a gradient of change of the discharge capacity if the vehicle speed is in a high range, and controlling the discharge capacity of the hydraulic motor so as to increase the discharge capacity and decrease the gradient of change of the discharge capacity if the vehicle speed is in a low range;

(G) controlling a discharge capacity of the hydraulic motor within a predetermined range in response to the accelerating amount and a braking amount due to a depressed brake pedal;

wherein the step of controlling the discharge capacity of the hydraulic motor in response to the accelerating amount and the braking amount comprises:

controlling the discharge capacity of the hydraulic motor so as to decrease the discharge capacity if the vehicle speed is in a high range, and controlling the discharge capacity of the hydraulic motor so as to increase the discharge capacity if the vehicle speed is in a low range;

(H) calculating an absorbing torque of the hydraulic pump responsive to the rotational speed of the hydraulic motor and the rotational speed of the engine;

wherein the step of calculating comprises:

calculating a first value of the absorbing torque when a selected position of the shifter indicates forward traveling, and calculating a second value of the absorbing torque when the selected position of the shifter indicates rearward traveling, wherein the second value is greater than the first value; and (I) when the selected position of the shifter indicates forward traveling or reverse traveling, performing creep traveling by opening the directional control valve only a predetermined amount in response to the accelerating amount and the rotational speed of the hydraulic motor.

2. A method in accordance with claim 1, wherein the step of controlling the hydraulic driving apparatus comprises:

discriminating, from the accelerating amount and the rotational speed of the hydraulic motor, between a powering travel of the vehicle and a braking travel of the vehicle; and when a powering travel is discriminated, opening fully the directional control valve in response to the rotational speed of the hydraulic motor and the accelerating amount, thereby reducing resistance of the directional control valve.

3. A method in accordance with claim 1, wherein the step of controlling the hydraulic driving apparatus comprises:

discriminating, from the accelerating amount and the rotational speed of the hydraulic motor, between a powering travel of the vehicle and a braking travel of the vehicle;

when a braking travel is discriminated and the accelerating amount is in a relatively low range, opening the directional control valve only a first predetermined amount in response to the rotational speed of the hydraulic motor and the accelerating amount; and when a braking travel is discriminated and the accelerating amount is in a relatively high range, opening the directional control valve only a second predetermined amount in response to the rotational speed of the hydraulic motor and the accelerating amount, said second predetermined amount being greater than said first predetermined amount.

4. A method in accordance with claim 1, wherein the step of controlling the hydraulic driving apparatus comprises:

discriminating, from the accelerating amount and the rotational speed of the hydraulic motor, between a powering travel and a braking travel; and when a braking travel is discriminated, allowing oil, returning from the hydraulic motor toward a tank, to have a high pressure so as to be fed to the supply side of the hydraulic motor if an inlet pressure to the hydraulic motor is lower than a permissible suction pressure of the hydraulic motor.

5. A method in accordance with claim 1, wherein the step of controlling the hydraulic driving apparatus comprises:

controlling absorbing torque of the hydraulic pump within a predetermined range in response to the rotational speed of the hydraulic motor and the rotational speed of the engine;

wherein the step of controlling absorbing torque comprises:

decreasing the absorbing torque of the hydraulic pump if the vehicle speed is in a high range; and increasing the absorbing torque of the hydraulic pump if the vehicle speed is in a low range.

6. A method in accordance with claim 1, wherein the step of controlling the hydraulic driving apparatus comprises:

controlling the rotational speed of the engine within a predetermined range in response to the accelerating amount and the rotational speed of said hydraulic motor;

wherein the step of controlling the rotational speed of the engine comprises:

increasing the rotational speed of the engine so that the gradient of the change of the rotational speed of the engine is increased if the vehicle speed is in a high range, and decreasing the rotational speed of the engine so that the gradient of the change of the rotational speed of the engine is decreased if the vehicle speed is in a low range.

7. A method in accordance with claim 1, wherein the step of controlling the hydraulic driving apparatus comprises:

controlling a discharge capacity of the hydraulic motor in response to the rotational speed of the hydraulic motor and a supply side pressure of the hydraulic motor;

wherein the step of controlling a discharge capacity of the hydraulic motor comprises:

controlling the discharge capacity of the hydraulic motor so as to decrease the discharge capacity and increase a gradient of change of the discharge capacity if the vehicle speed is in a high range, and controlling the discharge capacity of the hydraulic motor so as to increase the discharge capacity and decrease the gradient of change of the discharge capacity if the vehicle speed is in a low range.

8. A method in accordance with claim 1, wherein the step of controlling the hydraulic driving apparatus comprises:

controlling a discharge capacity of the hydraulic motor within a predetermined range in response to the accelerating amount and a braking amount due to a depressed brake pedal;

wherein the step of controlling the discharge capacity of the hydraulic motor in response to the accelerating amount and the braking amount comprises:

controlling the discharge capacity of the hydraulic motor so as to decrease the discharge capacity if the vehicle speed is in a high range, and controlling the discharge capacity of the hydraulic motor so as to increase the discharge capacity if the vehicle speed is in a low range.

9. A method in accordance with claim 1, wherein the step of controlling the hydraulic driving apparatus comprises:

calculating an absorbing torque of the hydraulic pump responsive to the rotational speed of the hydraulic motor and the rotational speed of the engine;

wherein the step of calculating comprises:

calculating a first value of the absorbing torque when a selected position of the shifter indicates forward traveling, and calculating a second value of the absorbing torque when the selected position of the shifter indicates rearward traveling, wherein the second value is greater than the first value.

10. A method in accordance with claim 1, wherein the step of controlling the hydraulic driving apparatus comprises:

when the selected position of the shifter indicates forward traveling or reverse traveling, performing creep traveling by opening the directional control valve only a predetermined amount in response to the accelerating amount and the rotational speed of the hydraulic motor.

11. Apparatus comprising:

a vehicle;

an engine;

a device for changing a rotational speed of the engine by an accelerating amount;

a hydraulic pump, said hydraulic pump being driven by the engine;

a directional control valve;

a hydraulic motor for traveling the vehicle, the hydraulic motor receiving pressurized oil from the hydraulic pump through the directional control valve;

a shifter to select forward traveling or reverse traveling of the vehicle;

an operating machine;

an operating machine actuator for driving said operating machine; and a control device, wherein said control device comprises at least one of the following eleven combinations of features:

(A) a motor rotational speed sensor for detecting a traveling speed of the vehicle from a rotational speed of the hydraulic motor; and an accelerating amount detection sensor for detecting the accelerating amount;

wherein said control device discriminates, from the accelerating amount and the rotational speed of the hydraulic motor, between a powering travel of the vehicle and a braking travel of the vehicle; and when a powering travel is discriminated, said control device opens fully the directional control valve in response to the rotational speed of the hydraulic motor and the accelerating amount, thereby reducing resistance of the directional control valve;

(B) a motor rotational speed sensor for detecting a traveling speed of the vehicle from a rotational speed of the hydraulic motor; and an accelerating amount detection sensor for detecting the accelerating amount;

wherein said control device discriminates, from the accelerating amount and the rotational speed of the hydraulic motor, between a powering travel of the vehicle and a braking travel of the vehicle;

wherein when a braking travel is discriminated and the accelerating amount is in a relatively low range, said control device partially opens the directional control valve only a first predetermined amount in response to the rotational speed of the hydraulic motor and the accelerating amount; and wherein when a braking travel is discriminated and the accelerating amount is in a relatively high range, said control device partially opens the directional control valve only a second predetermined amount in response to the rotational speed of the hydraulic motor and the accelerating amount, the second predetermined amount being greater than the first predetermined amount;

(C) a motor rotational speed sensor for detecting a rotational speed of the hydraulic motor; and an accelerating amount detection sensor for detecting the accelerating amount;

wherein said control device discriminates, from the accelerating amount and the rotational speed of the hydraulic motor, between a powering travel and a braking travel; and when a braking travel is discriminated, said control device allows oil, returning from the hydraulic motor toward a tank, to have a high pressure so as to be fed to the supply side of the hydraulic motor if an inlet pressure to the hydraulic motor is lower than a predetermined suction pressure of the hydraulic motor;

(D) a motor rotational speed sensor for detecting a traveling speed of the vehicle from a rotational speed of the hydraulic motor; and a sensor for detecting a rotational speed of the engine;

wherein said control device controls absorbing torque of the hydraulic pump within a predetermined range in response to the rotational speed of the hydraulic motor and the rotational speed of the engine;

wherein said control device decreases the absorbing torque of the hydraulic pump if the traveling speed is in a high range and increases the absorbing torque of the hydraulic pump if the traveling speed is in a low range;

(E) a motor rotational speed sensor for detecting a traveling speed of the vehicle from a rotational speed of the hydraulic motor; and an accelerating amount detection sensor for detecting the accelerating amount;

wherein said control device controls the rotational speed of the engine within a predetermined range in response to the accelerating amount and the rotational speed of said hydraulic motor, wherein said control device increases the rotational speed of the engine so that the gradient of the change of the rotational speed of the engine is increased if the traveling speed is in a high range, and said control device decreases the rotational speed of the engine so that the gradient of the change of the rotational speed of the engine is decreased if the traveling speed is in a low range;

(F) a motor rotational speed sensor for detecting a traveling speed of the vehicle from a rotational speed of the hydraulic motor; and a pressure sensor for detecting a supply side pressure of the hydraulic motor;

wherein said control device controls a discharge capacity of the hydraulic motor in response to the rotational speed of the hydraulic motor and the supply side pressure of the hydraulic motor, wherein said control device controls the discharge capacity of the hydraulic motor so as to decrease the discharge capacity and increase a gradient of change of the discharge capacity if the traveling speed is in a high range, and wherein said control device controls the discharge capacity of the hydraulic motor so as to increase the discharge capacity and decrease the gradient of change of the discharge capacity if the traveling speed is in a low range;

(G) a brake pedal;

a motor rotational speed sensor for detecting a traveling speed of the vehicle from a rotational speed of the hydraulic motor; and a sensor for detecting a braking amount due to a depressing of said brake pedal;

wherein said control device controls a discharge capacity of the hydraulic motor within a predetermined range in response to the accelerating amount and the braking amount, wherein said control device controls the discharge capacity of the hydraulic motor so as to decrease the discharge capacity if the traveling speed is in a high range, and said control device controls the discharge capacity of the hydraulic motor so as to increase the discharge capacity if the traveling speed is in a low range;

(H) a motor rotational speed sensor for detecting a rotational speed of the hydraulic motor;

a sensor for detecting a selected position of the shifter; and a sensor for detecting a rotational speed of the engine;

wherein said control device calculates an absorbing torque of the hydraulic pump responsive to the rotational speed of the hydraulic motor and the rotational speed of the engine and wherein said control device calculates a first value of the absorbing torque when a detected selected position of the shifter indicates forward traveling, and calculates a second value of the absorbing torque when a detected selected position of the shifter indicates rearward traveling, wherein the second value is greater than the first value;

(I) a motor rotational speed sensor for detecting a rotational speed of the hydraulic motor;

an accelerating amount detection sensor for detecting the accelerating amount; and a sensor for detecting a selected position of the shifter;

wherein, when a detected selected position of the shifter indicates forward traveling or reverse traveling, said control device provides for creep traveling by partially opening the directional control valve only a predetermined amount in response to the accelerating amount and the rotational speed of the hydraulic motor;

(J) a brake pedal;

motor pressure sensors for detecting inlet pressure to the hydraulic motor and outlet pressure from the hydraulic motor;

a braking amount detection sensor for detecting a braking amount of the brake pedal;

an oil tank;

a return circuit formed between the directional control valve and the oil tank; and a variable pressure two-stage back pressure valve for controlling pressure in the return circuit; and wherein, at a time of braking, the control device compares the detected inlet pressure with a permissible suction pressure of the hydraulic motor, and when the detected inlet pressure is lower than the permissible suction pressure, the control device outputs a command to the two-stage back pressure valve to increase the pressure in the return circuit; and (K) a mode selection switch for selecting an operating mode or a traveling mode; and a mode detection sensor for detecting the thus selected mode; and wherein, when the mode selection switch selects the traveling mode, the control device outputs an operation command to the directional control valve for supplying pressurized oil passing through the directional control valve to the hydraulic motor, and wherein, when the mode selection switch selects the operating mode, the control device outputs either (a) an operation command for supplying pressurized oil passing through the directional control valve to the hydraulic motor or (b) an operation command for supplying pressurized oil passing through the directional control valve to the hydraulic motor and the operating machine actuator.

12. Apparatus in accordance with claim 11, wherein said control device comprises:

a motor rotational speed sensor for detecting a traveling speed of the vehicle from a rotational speed of the hydraulic motor; and an accelerating amount detection sensor for detecting the accelerating amount;

wherein said control device discriminates, from the accelerating amount and the rotational speed of the hydraulic motor, between a powering travel of the vehicle and a braking travel of the vehicle; and when a powering travel is discriminated, said control device opens fully the directional control valve in response to the rotational speed of the hydraulic motor and the accelerating amount, thereby reducing resistance of the directional control valve.

13. Apparatus in accordance with claim 11, wherein said control device comprises:

a motor rotational speed sensor for detecting a traveling speed of the vehicle from a rotational speed of the hydraulic motor; and an accelerating amount detection sensor for detecting the accelerating amount;

wherein said control device discriminates, from the accelerating amount and the rotational speed of the hydraulic motor, between a powering travel of the vehicle and a braking travel of the vehicle;

wherein when a braking travel is discriminated and the accelerating amount is in a relatively low range, said control device partially opens the directional control valve only a first predetermined amount in response to the rotational speed of the hydraulic motor and the accelerating amount; and wherein when a braking travel is discriminated and the accelerating amount is in a relatively high range, said control device partially opens the directional control valve only a second predetermined amount in response to the rotational speed of the hydraulic motor and the accelerating amount, the second predetermined amount being greater than the first predetermined amount.

14. Apparatus in accordance with claim 11, wherein said control device comprises:

a motor rotational speed sensor for detecting a rotational speed of the hydraulic motor; and an accelerating amount detection sensor for detecting the accelerating amount;

wherein said control device discriminates, from the accelerating amount and the rotational speed of the hydraulic motor, between a powering travel and a braking travel; and when a braking travel is discriminated, said control device allows oil, returning from the hydraulic motor toward a tank, to have a high pressure so as to be fed to the supply side of the hydraulic motor if an inlet pressure to the hydraulic motor is lower than a predetermined suction pressure of the hydraulic motor.

15. Apparatus in accordance with claim 11, wherein said control device comprises:

a motor rotational speed sensor for detecting a traveling speed of the vehicle from a rotational speed of the hydraulic motor; and a sensor for detecting a rotational speed of the engine;

wherein said control device controls absorbing torque of the hydraulic pump within a predetermined range in response to the rotational speed of the hydraulic motor and the rotational speed of the engine;

wherein said control device decreases the absorbing torque of the hydraulic pump if the traveling speed is in a high range and increases the absorbing torque of the hydraulic pump if the traveling speed is in a low range.

16. Apparatus in accordance with claim 11, wherein said control device comprises:

a motor rotational speed sensor for detecting a traveling speed of the vehicle from a rotational speed of the hydraulic motor; and an accelerating amount detection sensor for detecting the accelerating amount;

wherein said control device controls the rotational speed of the engine within a predetermined range in response to the accelerating amount and the rotational speed of said hydraulic motor, wherein said control device increases the rotational speed of the engine so that the gradient of the change of the rotational speed of the engine is increased if the traveling speed is in a high range, and said control device decreases the rotational speed of the engine so that the gradient of the change of the rotational speed of the engine is decreased if the traveling speed is in a low range.

17. Apparatus in accordance with claim 11, wherein said control device comprises:

a motor rotational speed sensor for detecting a traveling speed of the vehicle from a rotational speed of the hydraulic motor; and a pressure sensor for detecting a supply side pressure of the hydraulic motor;

wherein said control device controls a discharge capacity of the hydraulic motor in response to the rotational speed of the hydraulic motor and the supply side pressure of the hydraulic motor, wherein said control device controls the discharge capacity of the hydraulic motor so as to decrease the discharge capacity and increase a gradient of change of the discharge capacity if the traveling speed is in a high range, and wherein said control device controls the discharge capacity of the hydraulic motor so as to increase the discharge capacity and decrease the gradient of change of the discharge capacity if the traveling speed is in a low range.

18. Apparatus in accordance with claim 11, wherein said control device comprises:

a brake pedal;

a motor rotational speed sensor for detecting a traveling speed of the vehicle from a rotational speed of the hydraulic motor; and a sensor for detecting a braking amount due to a depressing of said brake pedal;

wherein said control device controls a discharge capacity of the hydraulic motor within a predetermined range in response to the accelerating amount and the braking amount, wherein said control device controls the discharge capacity of the hydraulic motor so as to decrease the discharge capacity if the traveling speed is in a high range, and said control device controls the discharge capacity of the hydraulic motor so as to increase the discharge capacity if the traveling speed is in a low range.

19. Apparatus in accordance with claim 11, wherein said control device comprises:

a motor rotational speed sensor for detecting a rotational speed of the hydraulic motor;

a sensor for detecting a selected position of the shifter; and a sensor for detecting a rotational speed of the engine;

wherein said control device calculates an absorbing torque of the hydraulic pump responsive to the rotational speed of the hydraulic motor and the rotational speed of the engine and wherein said control device calculates a first value of the absorbing torque when a detected selected position of the shifter indicates forward traveling, and calculates a second value of the absorbing torque when a detected selected position of the shifter indicates rearward traveling, wherein the second value is greater than the first value.

20. Apparatus in accordance with claim 11, wherein said control device comprises:

a motor rotational speed sensor for detecting a rotational speed of the hydraulic motor;

an accelerating amount detection sensor for detecting the accelerating amount; and a sensor for detecting a selected position of the shifter;

wherein, when a detected selected position of the shifter indicates forward traveling or reverse traveling, said control device provides for creep traveling by partially opening the directional control valve only a predetermined amount in response to the accelerating amount and the rotational speed of the hydraulic motor.

21. Apparatus in accordance with claim 11, wherein said control device comprises:

a brake pedal;

motor pressure sensors for detecting inlet pressure to the hydraulic motor and outlet pressure from the hydraulic motor;

a braking amount detection sensor for detecting a braking amount of the brake pedal;

an oil tank;

a return circuit formed between the directional control valve and the oil tank; and a variable pressure two-stage back pressure valve for controlling pressure in the return circuit; and wherein, at a time of braking, the control device compares the detected inlet pressure with a permissible suction pressure of the hydraulic motor, and when the detected inlet pressure is lower than the permissible suction pressure, the control device outputs a command to the two-stage back pressure valve to increase the pressure in the return circuit.

22. Apparatus in accordance with claim 11, wherein said control device comprises:

a mode selection switch for selecting an operating mode or a traveling mode; and a mode detection sensor for detecting the thus selected mode; and wherein, when the mode selection switch selects the traveling mode, the control device outputs an operation command to the directional control valve for supplying pressurized oil passing through the directional control valve to the hydraulic motor, and wherein, when the mode selection switch selects the operating mode, the control device outputs either (a) an operation command for supplying pressurized oil passing through the directional control valve to the hydraulic motor or (b) an operation command for supplying pressurized oil passing through the directional control valve to the hydraulic motor and the operating machine actuator.

* * * * *